(12) United States Patent
Ono et al.

(10) Patent No.: US 11,214,219 B2
(45) Date of Patent: Jan. 4, 2022

(54) AIRBAG DEVICE

(71) Applicant: TOYODA GOSEI CO., LTD., Kiyosu (JP)

(72) Inventors: Minoru Ono, Kiyosu (JP); Tetsuya Ogata, Kiyosu (JP); Naoki Hotta, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 129 days.

(21) Appl. No.: 16/812,542

(22) Filed: Mar. 9, 2020

(65) Prior Publication Data
US 2020/0307494 A1 Oct. 1, 2020

(30) Foreign Application Priority Data

Mar. 27, 2019 (JP) .............................. JP2019-060025
Mar. 27, 2019 (JP) .............................. JP2019-060026

(51) Int. Cl.
*B60R 21/261* (2011.01)
*B60R 21/217* (2011.01)
*B60R 21/237* (2006.01)
*B60R 21/26* (2011.01)
*B60R 21/206* (2011.01)

(52) U.S. Cl.
CPC ........ *B60R 21/2171* (2013.01); *B60R 21/261* (2013.01); *B60R 21/206* (2013.01); *B60R 21/237* (2013.01); *B60R 2021/26082* (2013.01)

(58) Field of Classification Search
CPC . B60R 21/206; B60R 21/2171; B60R 21/237; B60R 21/261; B60R 2021/26082
See application file for complete search history.

(56) References Cited

U.S. PATENT DOCUMENTS

| 4,153,273 A | * | 5/1979 | Risko | .................. | B60R 21/2171 |
| | | | | | 280/728.2 |
| 4,191,392 A | * | 3/1980 | Barnett | ............... | B60R 21/2171 |
| | | | | | 280/740 |
| 5,433,471 A | * | 7/1995 | Shepherd | ............ | B60R 21/2171 |
| | | | | | 280/728.2 |

(Continued)

FOREIGN PATENT DOCUMENTS

| JP | 2002-037012 A | 2/2002 |
| JP | 2010-149690 A | 7/2010 |
| JP | 2018-167796 A | 11/2018 |

*Primary Examiner* — Barry Gooden, Jr.
(74) *Attorney, Agent, or Firm* — Posz Law Group, PLC

(57) ABSTRACT

An airbag device includes an airbag, an inflator and an attachment base. The airbag includes a body portion, and an inflow port portion, into which the distal end side of the inflator is inserted. The attachment base includes a holding plate portion including a pressing portion and a support portion that are provided at positions displaced around an axial center of the inflator so as to surround a periphery of the inflow port portion into which the distal end side of the inflator is inserted. The pressing portion is plastically deformable so as to approach a side of the support portion by being crimped, and the distal end side of the inflator inserted between the pressing portion and the support portion and the inflow port portion are sandwiched between the crimped pressing portion and the support portion, and are held by the attachment base.

9 Claims, 29 Drawing Sheets

(56) References Cited

U.S. PATENT DOCUMENTS

| | | | | |
|---|---|---|---|---|
| 5,433,472 A * | 7/1995 | Green | B60R 21/2171 | 280/728.2 |
| 5,470,102 A * | 11/1995 | Smith | B60R 21/2171 | 280/728.2 |
| 5,503,429 A * | 4/1996 | Wallner | B60R 21/2171 | 280/728.1 |
| 5,556,127 A * | 9/1996 | Hurford | B60R 21/201 | 280/728.2 |
| 5,558,362 A * | 9/1996 | Acker | B60R 21/2171 | 280/728.2 |
| 5,752,712 A * | 5/1998 | Acker | B60R 21/2171 | 280/728.2 |
| 5,833,266 A * | 11/1998 | Bartoldus | B60R 21/23 | 280/743.1 |
| 5,857,696 A * | 1/1999 | Inoue | B60R 21/23 | 280/728.2 |
| 5,887,891 A * | 3/1999 | Taguchi | B60R 21/2171 | 280/728.2 |
| 5,906,395 A * | 5/1999 | Isaji | B60R 21/237 | 280/743.1 |
| 5,988,677 A * | 11/1999 | Adomeit | B60R 21/205 | 280/736 |
| 6,113,136 A * | 9/2000 | Hamada | B60R 21/2035 | 280/728.2 |
| 7,370,879 B2 * | 5/2008 | Hotta | B60R 21/206 | 280/728.2 |
| 2001/0022440 A1* | 9/2001 | Lang | B60R 21/2171 | 280/728.2 |
| 2001/0026063 A1* | 10/2001 | Yokota | B60R 21/205 | 280/732 |
| 2003/0132618 A1* | 7/2003 | Suzuki | B60R 21/2165 | 280/730.1 |
| 2003/0141705 A1* | 7/2003 | Oka | B60R 21/2176 | 280/728.2 |
| 2004/0080146 A1* | 4/2004 | Lutz | B60R 21/2171 | 280/736 |
| 2005/0073134 A1* | 4/2005 | Matsuura | B60R 21/206 | 280/730.1 |
| 2005/0082793 A1* | 4/2005 | Lee | B60R 21/2171 | 280/728.2 |
| 2005/0116446 A1* | 6/2005 | Mabuchi | B60R 21/231 | 280/728.2 |
| 2005/0121883 A1* | 6/2005 | Joos | B60R 21/201 | 280/728.2 |
| 2005/0140123 A1* | 6/2005 | Hotta | B60R 21/2171 | 280/730.1 |
| 2005/0189739 A1* | 9/2005 | DePottey | B60R 21/261 | 280/728.2 |
| 2005/0194767 A1* | 9/2005 | Freisler | B60R 21/206 | 280/728.2 |
| 2005/0225058 A1* | 10/2005 | Braun | B60R 21/2171 | 280/728.2 |
| 2006/0061073 A1* | 3/2006 | Naruse | B60R 21/21 | 280/730.2 |
| 2006/0103124 A1* | 5/2006 | Marotzke | B60R 21/2171 | 280/740 |
| 2006/0108777 A1* | 5/2006 | Mabuchi | B60R 21/237 | 280/730.2 |
| 2006/0131842 A1* | 6/2006 | Meier | B60R 21/217 | 280/728.2 |
| 2006/0279073 A1* | 12/2006 | Hotta | B60R 21/217 | 280/730.1 |
| 2007/0096439 A1* | 5/2007 | Kashiwagi | B60R 21/233 | 280/728.2 |
| 2007/0228744 A1* | 10/2007 | Meier | B60R 21/2171 | 292/256.6 |
| 2007/0284858 A1* | 12/2007 | Nishimura | B60R 21/217 | 280/729 |
| 2008/0084051 A1* | 4/2008 | Okuhara | B60R 21/2171 | 280/728.2 |
| 2008/0100042 A1* | 5/2008 | Adachi | B60R 21/2171 | 280/730.1 |
| 2008/0106074 A1* | 5/2008 | Ford | B60R 21/2171 | 280/728.2 |
| 2008/0238048 A1* | 10/2008 | Ishida | B60R 21/206 | 280/728.2 |
| 2009/0001699 A1* | 1/2009 | Honold | B60R 21/2171 | 280/740 |
| 2009/0058048 A1* | 3/2009 | Ishida | B60R 21/20 | 280/728.2 |
| 2009/0058052 A1* | 3/2009 | Ford | B60R 21/2171 | 280/730.1 |
| 2009/0072523 A1* | 3/2009 | Yokota | B60R 21/2171 | 280/730.2 |
| 2009/0085333 A1* | 4/2009 | Imaeda | B60R 21/2032 | 280/730.1 |
| 2009/0102170 A1* | 4/2009 | Lee | B60R 21/2171 | 280/741 |
| 2009/0152839 A1* | 6/2009 | Thomas | B60R 21/215 | 280/728.2 |
| 2009/0230661 A1* | 9/2009 | Fukawatase | B60R 21/237 | 280/730.1 |
| 2009/0302585 A1* | 12/2009 | Ishida | B60R 21/2032 | 280/730.1 |
| 2010/0045004 A1* | 2/2010 | Glockler | B60R 21/201 | 280/728.2 |
| 2010/0096841 A1* | 4/2010 | Tanaka | B60R 21/2032 | 280/730.1 |
| 2010/0109365 A1* | 5/2010 | Shibata | B60R 21/206 | 296/37.12 |
| 2010/0181746 A1* | 7/2010 | Rose | B60R 21/2171 | 280/736 |
| 2010/0207364 A1* | 8/2010 | Arima | B60R 21/26 | 280/728.2 |
| 2010/0207368 A1* | 8/2010 | Weyrich | B60R 21/237 | 280/736 |
| 2011/0049848 A1* | 3/2011 | Walston | B60R 21/2171 | 280/730.2 |
| 2011/0163522 A1* | 7/2011 | Hamels | B60R 21/2171 | 280/728.2 |
| 2011/0227318 A1* | 9/2011 | Schorle | B60R 21/217 | 280/728.2 |
| 2012/0313358 A1* | 12/2012 | Okamoto | B60R 21/2346 | 280/740 |
| 2013/0015646 A1* | 1/2013 | Okamoto | B60R 21/2171 | 280/743.1 |
| 2013/0048405 A1* | 2/2013 | Okamoto | B60R 21/36 | 180/274 |
| 2013/0334800 A1* | 12/2013 | Yamazaki | B60R 21/263 | 280/736 |
| 2013/0341892 A1* | 12/2013 | Honda | B60R 21/2171 | 280/728.2 |
| 2014/0008899 A1* | 1/2014 | Vigeant | B60R 21/206 | 280/730.1 |
| 2014/0021701 A1* | 1/2014 | Broussard | B60R 21/206 | 280/728.2 |
| 2014/0049026 A1* | 2/2014 | Webber | B60R 21/206 | 280/730.1 |
| 2014/0084570 A1* | 3/2014 | Hotta | B60R 21/2171 | 280/728.2 |
| 2014/0232091 A1* | 8/2014 | Gaiser | B60R 21/2338 | 280/728.2 |
| 2014/0265262 A1* | 9/2014 | Witt, Jr. | B60R 21/262 | 280/728.2 |
| 2016/0009247 A1* | 1/2016 | Fujiwara | B60R 21/2171 | 280/728.2 |
| 2016/0096500 A1* | 4/2016 | Lannen | B60R 21/216 | 280/728.2 |
| 2017/0057451 A1* | 3/2017 | Jinnai | B60R 21/2171 | |
| 2017/0174165 A1* | 6/2017 | Gammill | B60R 21/2171 | |
| 2017/0174169 A1* | 6/2017 | Tanabe | B60R 21/2171 | |
| 2017/0247009 A1* | 8/2017 | Konaka | B60R 21/232 | |
| 2017/0349135 A1* | 12/2017 | Nagata | B60R 21/239 | |
| 2018/0050651 A1* | 2/2018 | Fukawatase | B60R 21/237 | |
| 2018/0126940 A1* | 5/2018 | Greer, Jr. | B60R 21/206 | |
| 2018/0281732 A1* | 10/2018 | Shigemura | B60R 21/231 | |
| 2018/0281733 A1* | 10/2018 | Shigemura | B60R 21/206 | |
| 2018/0281735 A1 | 10/2018 | Shigemura | | |

(56) References Cited

U.S. PATENT DOCUMENTS

| | | | | |
|---|---|---|---|---|
| 2018/0281738 A1* | 10/2018 | Otsuka | ................... | B32B 27/36 |
| 2019/0054886 A1* | 2/2019 | Ono | ................... | B60R 21/2165 |
| 2019/0071045 A1* | 3/2019 | Ozyurek | ............. | B60R 21/2171 |
| 2019/0118757 A1* | 4/2019 | Okayama | .......... | B60R 21/23138 |
| 2019/0202390 A1* | 7/2019 | Ono | ...................... | B60R 21/217 |
| 2019/0202392 A1* | 7/2019 | Ono | ...................... | B60R 21/206 |
| 2020/0282941 A1* | 9/2020 | Ross | ................... | B60R 21/206 |
| 2020/0339059 A1* | 10/2020 | Kobayashi | ............ | B60R 21/231 |
| 2020/0406850 A1* | 12/2020 | Takeuchi | .............. | B60R 21/231 |

* cited by examiner

AIRBAG DEVICE

CROSS-REFERENCE TO RELATED APPLICATIONS

This application is based upon and claims the benefit of priority from prior Japanese patent application No. 2019-060025, filed on Mar. 27, 2019 and Japanese patent application No. 2019-060026, filed on Mar. 27, 2019, the entire contents of which are incorporated herein by reference.

TECHNICAL FIELD

The present invention relates to an airbag device configured to be mounted on a vehicle, and more particularly to an airbag device in which an airbag and an inflator can be easily assembled to an attachment base.

BACKGROUND ART

In a related art, for example, a knee protection airbag device includes an airbag that inflates from a folded state by allowing inflation gas to flow therein, an inflator that supplies the inflation gas to the airbag, and a case which is an attachment base that holds the airbag and the inflator and is mounted on a mounting part (see, for example, Patent Literature 1). In the airbag device, the inflator includes a substantially columnar inflator body that discharges inflation gas, and a substantially cylindrical retainer that holds the inflator body. The airbag and the inflator are attached and fixed to the case using bolts protruding from the retainer and the inflator body. In other words, in the airbag device, the inflator body and the retainer are provided inside the folded airbag. The bolts extending from the inflator body and the retainer are protruded out of the airbag, and the protruded bolts are protruded from a bottom wall part of the case housing the folded airbag. Then, a nut is fastened to a distal end of each bolt to assemble the inflator and the airbag to the case.

Patent Literature 1: JP-A-2018-167796

However, in the related-art airbag device, the airbag and the inflator are assembled to the case which is the attachment base using a plurality of bolts and nuts, so that the number of components is large, cost and weight are increased, and operation of fastening the nuts to the plurality of bolts is required, which cause it difficult to assemble the airbag and the inflator easily.

The present invention is to solve the above-described problems. An aspect of the present invention provides an airbag device that can reduce the number of components, can reduce weight, and can be assembled easily.

SUMMARY OF INVENTION

According to an aspect of the invention, there is provided an airbag device including an airbag configured to inflate by allowing inflation gas to flow therein, an inflator configured to supply the inflation gas to the airbag, and an attachment base configured to hold the airbag and the inflator and configured be mounted on a mounting part, wherein the inflator has a substantially columnar shape, and includes, at a distal end side thereof, a gas discharge portion which is configured to discharge the inflation gas, the airbag includes a body portion which is configured to inflate from a folded state by allowing the inflation gas to flow therein, and a cylindrical inflow port portion which is communicated with the body portion, into which the distal end side of the inflator is inserted, and which is configured to allow the inflation gas from the inflator to flow into the body portion, the attachment base is formed of sheet metal, and includes a holding plate portion which is configured to allow the folded body portion to be provided at a front surface side thereof to hold the folded body portion, and which is configured to allow the inflow port portion and the inflator inserted into the inflow port portion to be provided at a back surface side thereof to hold the inflow port portion and the inflator, the holding plate portion includes a pressing portion and a support portion that are provided at positions displaced around an axial center of the inflator so as to surround a periphery of the inflow port portion into which the distal end side of the inflator is inserted, the pressing portion is plastically deformable so as to approach a side of the support portion by being crimped, and the distal end side of the inflator inserted between the pressing portion and the support portion and the inflow port portion of the airbag into which the distal end side of the inflator is inserted are sandwiched between the crimped pressing portion and the support portion, and are held by the attachment base.

DESCRIPTION OF EMBODIMENTS

Figure 1:
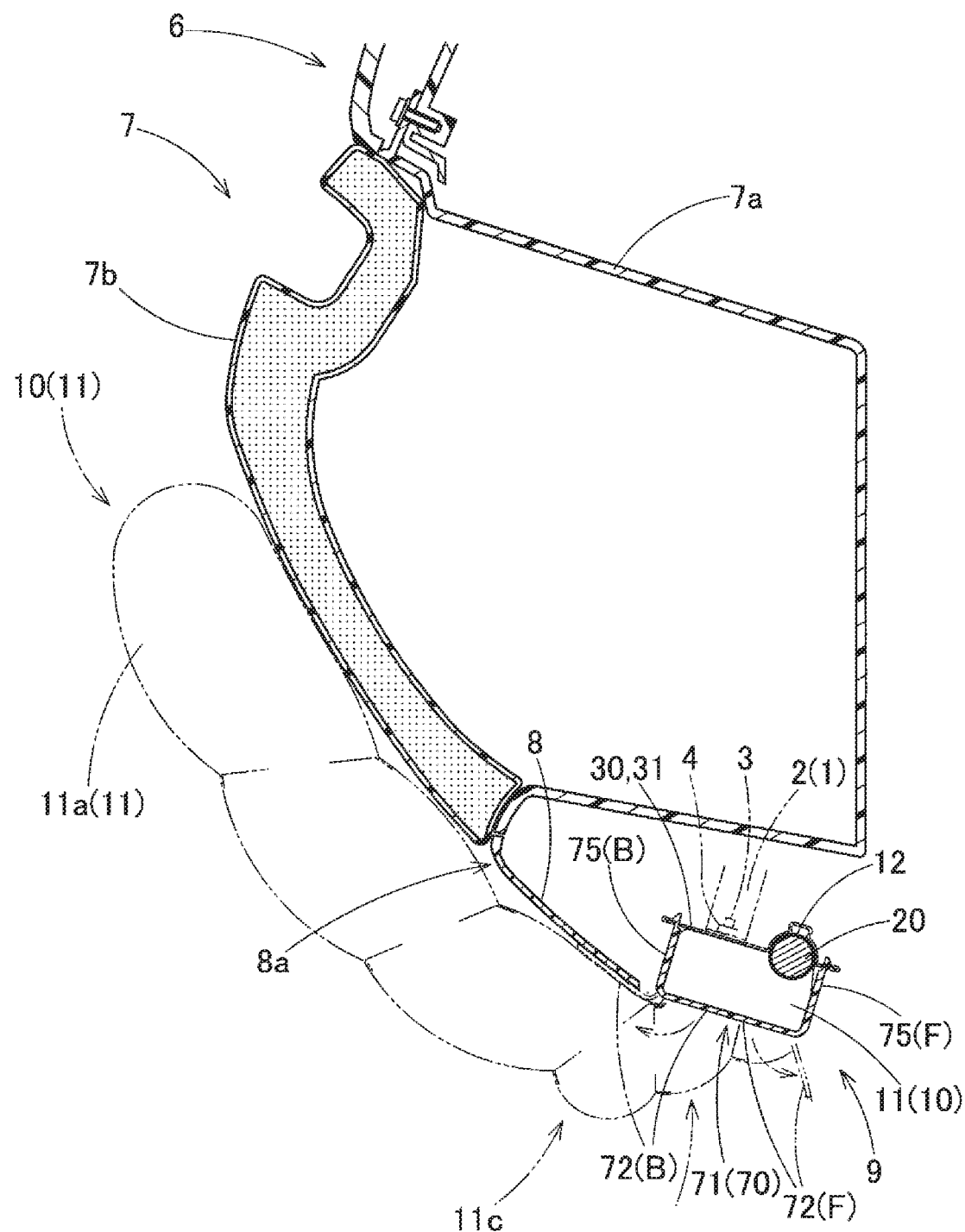
FIG. 1 is a schematic longitudinal sectional view illustrating a state in which a knee protection airbag device according to a first embodiment of the present invention is mounted in a vehicle.

Hereinafter, a first embodiment of the present invention will be described with reference to the drawings. As illustrated in FIG. 1, an airbag device 9 according to the first embodiment is for knee protection. The airbag device 9 is mounted at a lower side of an instrument panel 6 in front of a passenger seat, and specifically below a glove box 7 provided at the lower side of the instrument panel 6. The glove box 7 includes a box body 7a and a door portion 7b that closes rear of the box body 7a, and the door portion 7b is openable so as to rotate an upper edge side of the door portion 7b rearward. An under cover 8 is provided below the glove box 7, and a door arrangement wall portion 71 of an airbag cover 70 (described below) in the airbag device 9 is provided at an opening 8a of the under cover 8. The airbag device 9 is mounted at the lower side in front of the passenger seat.

Figure 2:
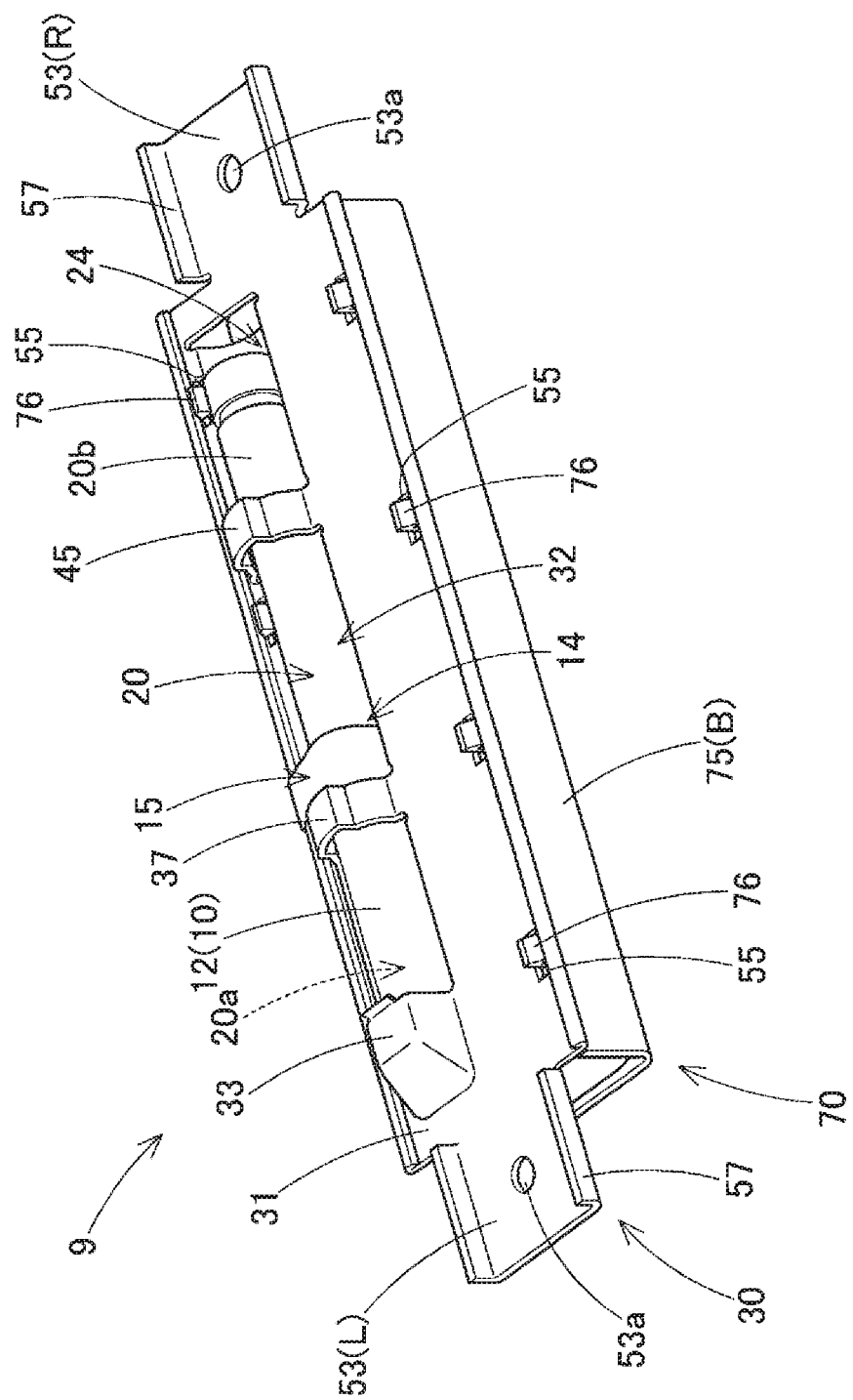
FIG. 2 is a schematic perspective view of the airbag device according to the first embodiment as viewed from a back surface side (an upper surface side) of the airbag device.
Figure 3:
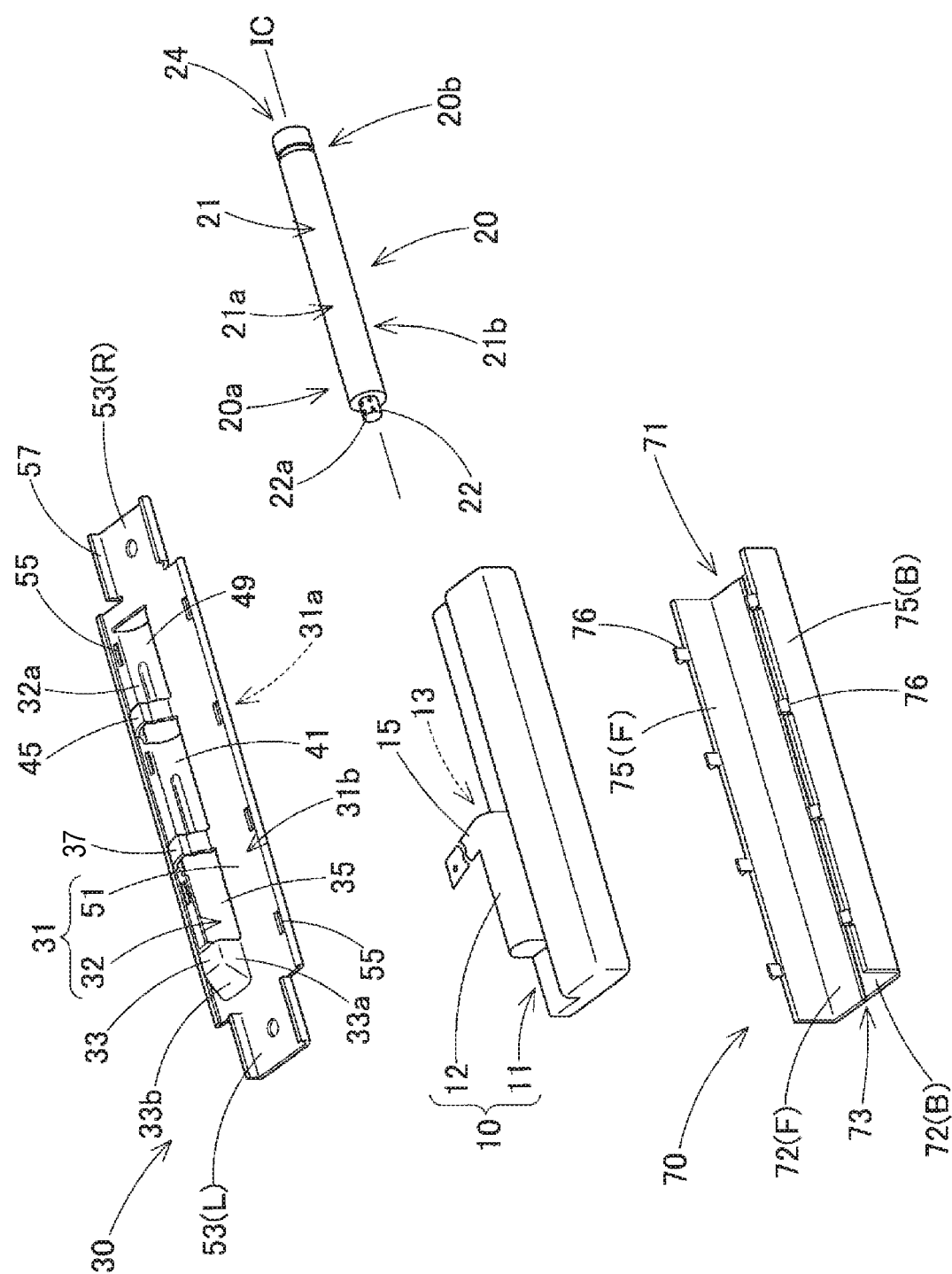
FIG. 3 is a schematic exploded perspective view of the airbag device according to the first embodiment.
Figure 4:
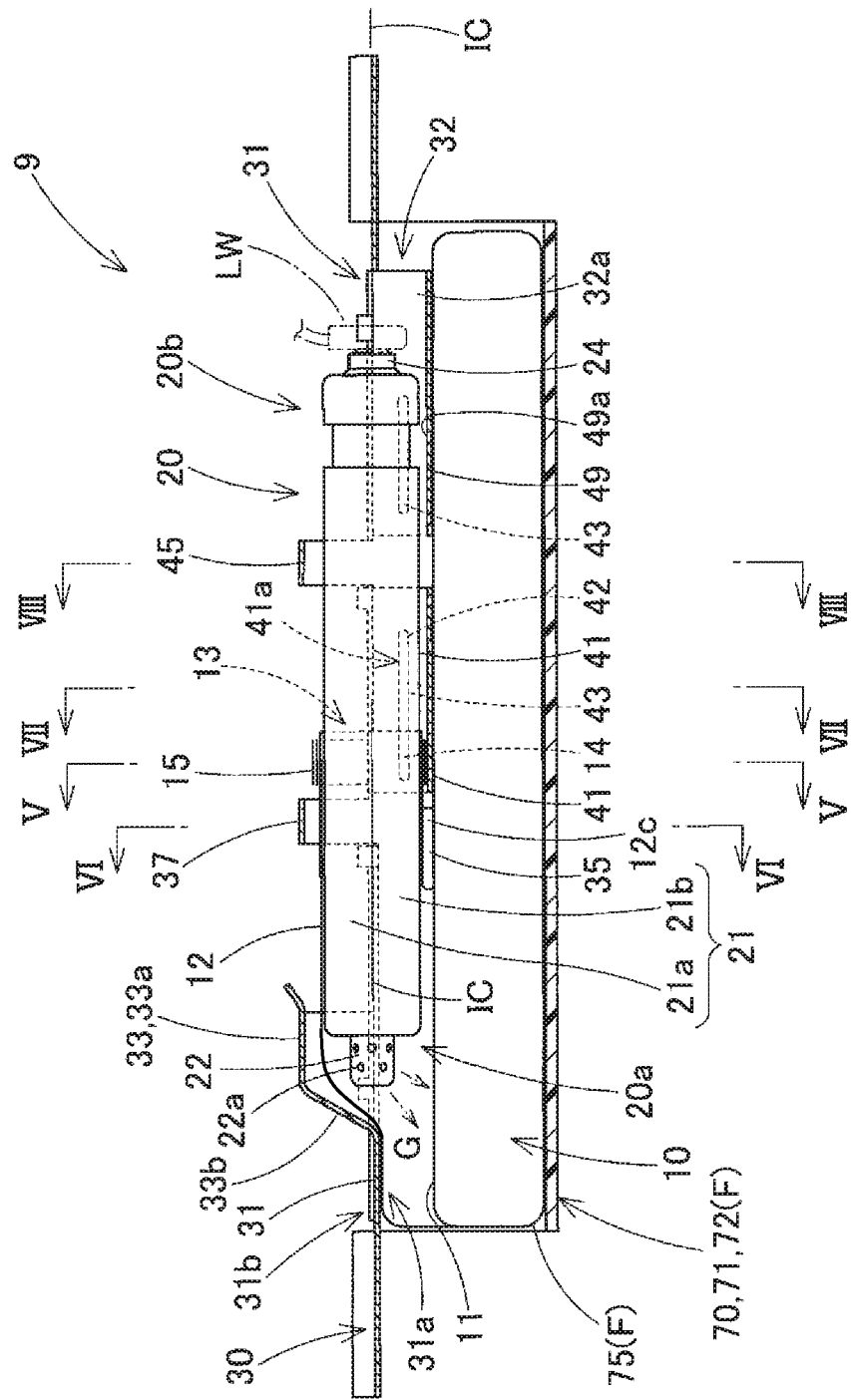
FIG. 4 is a schematic longitudinal sectional view of the airbag device according to the first embodiment, taken along a left-right direction.

As illustrated in FIGS. 1 to 8, the airbag device 9 includes an airbag 10 configured to inflate from a folded state by allowing inflation gas to flow therein so as to protect a knee of an occupant seated on a passenger seat, an inflator 20 configured to supply inflation gas G (see FIG. 4) to the airbag 10, an attachment base 30 configured to hold the airbag 10 and the inflator 20 and to be attached to a front lower side of the passenger seat that is a mounting part, and an airbag cover 70 configured to cover the folded airbag 10 and to be held by the attachment base 30. A front-rear direction, an upper-lower direction, and a left-right direction in the present specification each correspond to directions in a state in which the airbag device is mounted in the vehicle. As illustrated in FIGS. 1 to 3, a longitudinal direction of a substantially rectangular holding plate portion 31 of the attachment base 30 is the left-right direction, a short length direction is the front-rear direction, and a direction orthogonal to the holding plate portion 31 is the upper-lower direction.

As illustrated in FIGS. 1, 3, 4 and 9A to 9C, the airbag 10 includes a body portion 11 configured to inflate from a folded state by allowing the inflation gas G to flow therein, and a cylindrical (in the first embodiment, cylindrical) inflow port portion 12 which is communicated with the body portion 11, into which a distal end 20a side of the inflator 20 is inserted, and which is configured to allow inflation gas from the inflator 20 to flow into the body portion 11. A forming material of a peripheral wall of the body portion 11 extends from an inflow port portion 12 side of the body portion 11, and a connection sheet portion 12c that connects the body portion 11 and the inflow portion 12 is provided at the inflow port portion 12 side (see FIGS. 4, 6 and 9A to 9C). It is possible to reduce left-right swings of the body portion 11 during inflation as much as possible by the connection sheet portion 12c that is held by the attachment base 30 and extends from the inflow port portion 12 side.

As illustrated by a two-dot chain line in FIG. 1, during inflation, the body portion 11 pushes and opens door portions 72 (F, B) (described below) of the airbag cover 70 to protrude rearward and upward from the attachment base 30 and inflate in a substantially rectangular plate shape in front of left and right knees of the occupant, along the undercover 8, the door portion 7b, and left and right parts of the door portion 7b at the instrument panel 6. The body portion 11 at a completion of the inflation includes a lower part 11b that protrudes downward from the attachment base 30, a reversing part 11c that reverses upward from the lower part 11b, and an upper part 11a provided in front of the knee of the occupant.

In the inflow port portion 12, a winding portion 15 is provided in a vicinity of an opening 13 of an end. The winding portion 15 is formed integrally (integrally woven or integrally formed by suturing the winding portion 15 to the inflow port portion 12 separately) with a material (bag base fabric woven from a synthetic fiber that is polyester, polyamide, or the like) of the inflow port portion 12 of the airbag 10, and has a flexible band shape so as to be windable around an outer peripheral surface 12a side of the inflow port portion 12 into which the distal end 20a side of the inflator 20 is inserted. An end (a distal end) 16 of the winding portion 15 is formed with a lock hole 17 that is a to-be-locked portion configured to allow a lock protrusion 59 (see FIG. 5) that is a lock portion provided at the attachment base 30 to insert therein so as to maintain a winding state of the winding portion 15 wound around the inflow port portion 12.

The body portion 11 of the airbag 10 in the folded state is provided at a front surface lower surface) 31a side of a holding plate portion 31 (described below) of the attachment base 30, and the inflow port portion 12 extending from the body portion 11 is provided at a back surface (an upper surface) 31b side of the holding plate portion 31 through an insertion hole 35 (described below) of the holding plate portion 31. The inflow port portion 12 inserted through the insertion hole 35 is assembled to and held by the holding plate portion 31 together with the inflator 20 in a state in which the distal end 20*a* side of the inflator 20 is inserted therein.

The inflator 20 has a substantially columnar shape, and includes a gas discharge portion 22 formed with a plurality of gas discharge ports 22*a* configured to allow the inflation gas G to be discharged therethrough at a distal end 20*a*. A connector 24 that connects an actuation signal line LW configured to input an actuation signal is provided at an end surface of the inflator 20 on a base portion 20*b* side (see FIG. 4).

The attachment base 30 is formed of sheet metal that is a steel plate or the like, and includes the substantially rectangular plate-shaped holding plate portion 31. The holding plate portion 31 includes an assembly seat 32 configured to assemble the inflow port portion 12 of the airbag 10 and the inflator 20 at a front edge side of the holding plate portion 31 along the left-right direction, and a periphery of the assembly seat 32 has a substantially flat plate shape and is a support seat 51 configured to support the body portion 11 of the folded airbag 10.

The assembly seat 32 is formed with a concave part 32*a* that is recessed downward in a halved columnar shape so as to house the inflow port portion 12 of the airbag 10 and the inflator 20. The assembly seat 32 includes a cover portion 33 and pressing portions 37, 45 that protrude upward from the support seat 51 so as to cover the concave part 32*a*, and support portions 41, 49 that are recessed downward from the support seat 51 so as to form the concave part 32*a*. The assembly seat 32 includes an insertion hole 35 penetrating the assembly seat 32 in the upper-lower direction at a left end side of the assembly seat 32.

As described above, the insertion hole 35 is configured to allow the inflow port portion 12 extending from the body portion 11 of the airbag 10 to be inserted therethrough.

The cover portion 33 is configured to cover an upper side around a vicinity of the gas discharge portion 22 of the distal end 20*a* of the inflator 20 inserted through the inflow port portion 12, and includes a peripheral wall portion 33*a* having a substantially inverted U-shaped cross section and a ceiling wall portion 33*b* configured to close a left end side (a distal end side) of a peripheral wall portion 33*a*.

The support portions 41, 49 surround the inflow port portion 12 into which the distal end 20*a* side of the inflator 20 is inserted and a lower side of a periphery of the inflator 20, and are configured to support the inflow port portion 12 and the inflator 20. The support portion 49 is a second support portion, that is, a second support portion 49.

Figure 8:
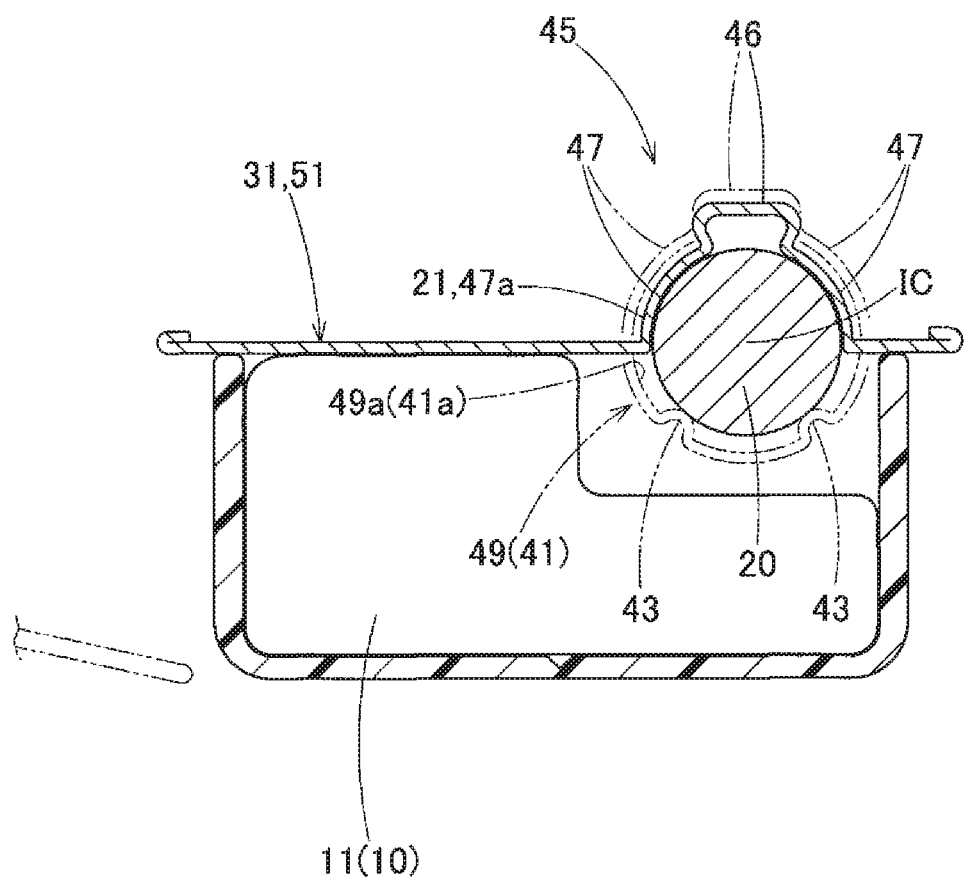
FIG. 8 is a schematic longitudinal sectional view of the airbag device according to the first embodiment, and corresponds to a part in FIG. 4.
Figure 9A:
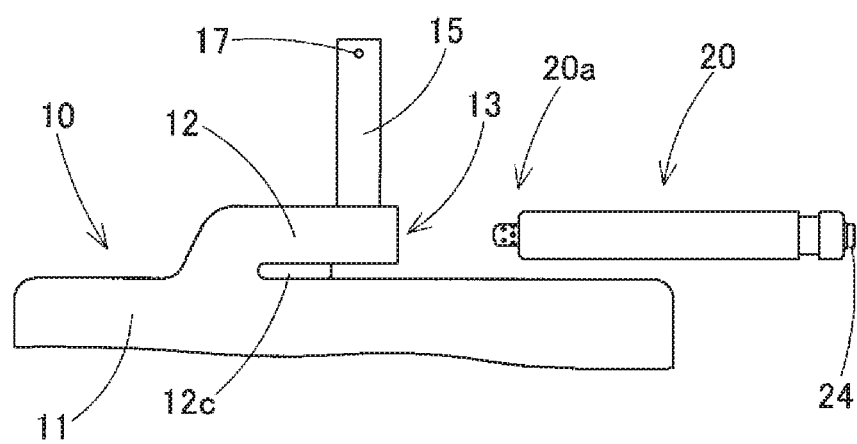
FIGS. 9A to 9C illustrate a winding state of a winding portion of an inflow port portion of the airbag according to the first embodiment.
Figure 9B:
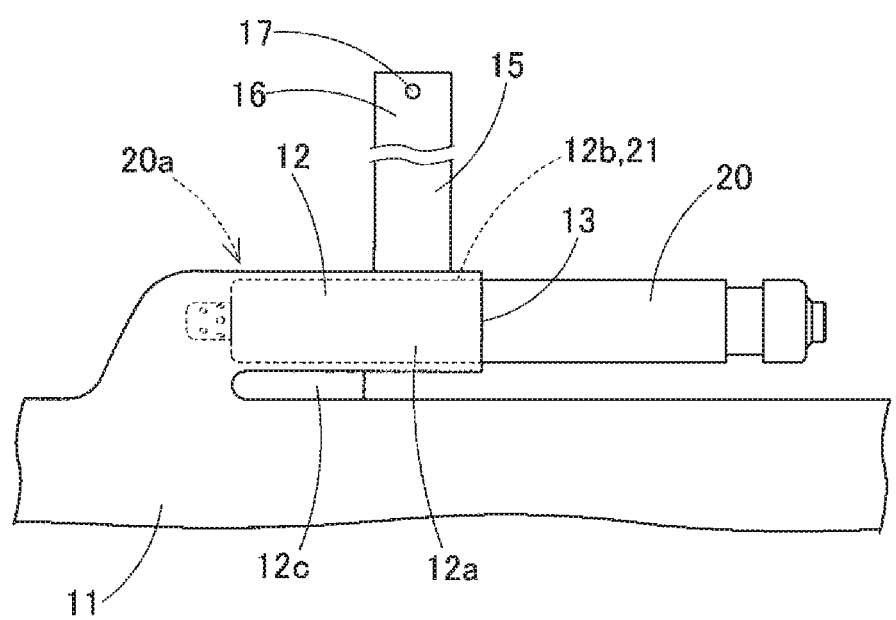
Figure 9C:
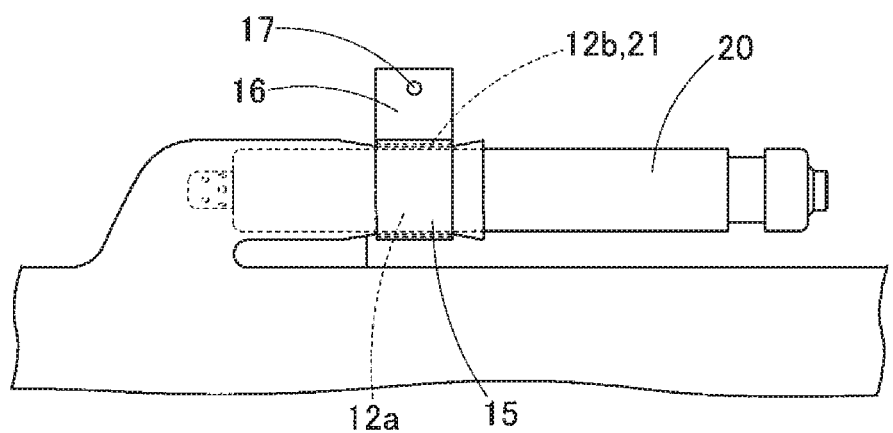

The second support portion 49 is provided at a right end side of the assembly seat 32 away from the cover portion 33, has a halved cylindrical shape to cover a lower side 21*b* of an outer peripheral surface 21 of a base portion 20*b* away from the gas discharge portion 23 of the inflator 20, and is configured to support the lower side 21*b* of the outer peripheral surface 21 at the base portion 20*b* side of the inflator 20 by an inner peripheral surface 49*a* (see FIG. 8).

The support portion 41 is provided near a center of the assembly seat 32 in the left-right direction, has a halved cylindrical shape to cover a lower side of a vicinity of the opening 13 of the inflow port portion 12 into which the inflator 20 is inserted and a lower side of the outer peripheral surface 21 of the inflator 20 that protrudes from the inflow port portion 12, and is configured to support the lower side 21*b* of the outer peripheral surface 21 of the inflator 20 in a state in which the inflow port portion 12 is interposed therebetween or the inflow port portion 12 is not interposed therebetween. The support portion 41 includes beads 43 that protrude from a general portion 42 toward an inner peripheral side thereof. In the illustrated example, the beads 43 are provided along an axial center (an axial direction) IC of the inflator 20 and are provided away from each other in the front-rear direction.

Similarly to the support portion 41, the second support portion 49 also includes the beads 43 at an inner peripheral surface 49*a* side.

The pressing portion 37 has a substantially halved cylindrical shape between the insertion hole 35 and the support portion 41, and includes a to-be-crimped portion 38 that has an inverted U-shaped cross section and is configured to be crimped and to be plastically deformed so as to reduce a diameter of the inner peripheral side and a band-shaped reduced diameter portion 39 connected to a support seat 51 side from two ends of the crimped portion 38. When the pressing portion 37 crimps the to-be-crimped portion 38 and causes the reduced diameter portion 39 to approach a support portion 41 side (an axial center IC side of the inflator 20), the pressing portion 37 sandwiches, between an inner peripheral surface 39*a* of the reduced diameter portion 39 and an inner peripheral surface 41*a* (particularly, a part of the bead 43) of the support portion 41, the inflator 20 inserted between the pressing portion 37 and the support portion 41 in a state in which the inflow port portion 12 is interposed therebetween.

The pressing portion 45 is a second pressing portion, that is, a second pressing portion 45. The second pressing portion 45 has a substantially halved cylindrical shape between the support portion 41 and the second support portion 49 and, similarly to the pressing portion 37, includes a to-be-crimped portion 46 that has an inverted U-shaped cross section and is configured to be crimped and to be plastically deformed so as to reduce a diameter of the inner peripheral side and a band-shaped reduced diameter portion 47 connected to the support seat 51 side from two ends of the crimped portion 46. When the pressing portion 45 crimps the to-be-crimped portion 46 and causes the reduced diameter portion 47 to approach a support portion 41, 49 side (the axial center IC side of the inflator 20), the pressing portion 45 sandwiches, between an inner peripheral surface 47*a* of the reduced diameter portion 47 and inner peripheral surfaces 41*a*, 49*a* (particularly, the part of the bead 43) of the support portions 41, 49, the inflator 20 inserted between the pressing portion 45 and the support portions 41, 49.

In the first embodiment, the inflow port portion 12 of the airbag 10 into which the inflator 20 is inserted is set so as not to reach an area of the second pressing portion 45.

As described above, the assembly seat 32 includes, sequentially from the left end side of the assembly seat 32, the cover portion 33, the insertion hole 35, the pressing portion 37, the support portion 41, the second pressing portion 45, and the second support portion 49 along the axial center (the axial direction) IC of the inflator 20 to be assembled. It is possible to easily form the holding plate portion 31 including the assembly seat 32 by forming holes, concave parts, and convex parts by performing pressing operation on a flat sheet metal material.

Attachment bracket portions 53 (L, R) configured to attach the airbag device 9 to the mounting part are formed at both left and right sides of the holding plate portion 31 of the attachment base 30. The attachment bracket portions 53 (L, R) are formed with attachment holes 53*a* penetrating therethrough, and the airbag device 9 can be mounted at a front lower side of the passenger seat below the glove box 7 by fastening the bolts 3 passing through the attachment holes 53*a* to the bracket 2 at a body 1 side with nuts 4.

Reinforcing ribs 57 protrude upward from front and rear edges of the attachment bracket portions 53 (L, R).

In the attachment base 30, connection concave parts 55 configured to allow connection convex parts 76 of the airbag cover 70 to be inserted therein and to connect and hold the connection convex parts 76 are opened at front and rear edges of the support seat 51.

In a vicinity of the support portion 41 on an upper surface side of the support seat 51, the lock protrusion 59 that is the lock portion protrudes to lock an end 16 by being inserted into the lock hole 17 that is the to-be-locked portion of the end 16 of the winding portion 15.

As illustrated in FIGS. 3 to 8, the airbag cover 70 is formed of a synthetic resin that is a polyolefin-based thermoplastic elastomer or the like, and includes a rectangular plate-shaped door arrangement wall portion 71 and connection wall portions 75 (F, B) that extend upward from front and rear edges of the door arrangement wall portion 71. The door arrangement wall portion 71 includes a thin breakable portion 73 along the left-right direction, and door portions 72 (F, B) configured to open forward and rearward by breaking the breakable portion 73 when the body portion 11 of the airbag 10 is inflated. The front and rear connection wall portions 75 (F, B) include, at upper ends thereof, a plurality of the connection convex parts 76 configured to be inserted and locked in the connection concave parts 55 of the attachment base 30.

In terms of assembly operation of the airbag device 9 according to the first embodiment, first, the body portion 11 of the airbag 10 is folded and wrapped with a wrapping material (not illustrated) for preventing collapse. Next, the body portion 11 of the airbag 10 is provided at the front surface 31a side of the holding plate portion 31 of the attachment base 30, and the inflow port portion 12 is taken out to the back surface 31b side of the holding plate portion 31 through the insertion hole 35. The connection convex portions 76 of the connection wall portion 75F, 75B are inserted and locked in the corresponding connection concave portions 55 of the holding plate portion 31 so as to cover the body portion 11 by the airbag cover 70.

Then, the inflow port portion 12 inserted through the insertion hole 35 is provided at an inner peripheral side of the pressing portion 37 before crimping, and then the distal end 20a side of the inflator 20 is inserted into the inflow port portion 12. The winding portion 15 is wound around the inflow port portion 12 into which the distal end 20a side of the inflator 20 is inserted, and then the base portion 20b side of the inflator 20 is inserted into the second pressing portion 45. Thereafter, when the to-be-crimped portions 38, 46 of the pressing portions 37, 45 are crimped and the reduced diameter portions 39, 47 approach the support portions 41, 49, the inflator 20 and the inflow port portion 12 into which the distal end 20a side of the inflator 20 is inserted are sandwiched between the pressing portions 37, 45 and the support portions 41, 49, are assembled to the holding plate portion 31, and are held by the attachment base 30, so that the airbag device 9 can be assembled. After the to-be-crimped portions 38, 46 have been crimped, the end 16 of the winding portion 15 allows the lock protrusion 59 to be inserted into and locked by the lock hole 17.

In terms of the winding of the winding portion 15, the winding portion 15 is wound to some extent loosely in advance to the inflow port portion 12 inserted through the insertion hole 35 and the pressing portion 37. Then, after the distal end 20a of the inflator 20 has been inserted into the pressing portion 45 and has been inserted into the inflow port portion 12, the end 16 may be locked to the lock protrusion 59 and the to-be-crimped portions 38, 46 may be crimped.

After the airbag device 9 has been assembled, the actuation signal line LW is connected to the connector 24 at the base portion 20b side of the inflator 20, and the attachment bracket portions 53 (L, R) of the attachment base 30 are attached to the bracket 2 at the body 1 side using the bolts 3 and the nuts 4. Accordingly, the airbag device 9 can be mounted at the predetermined mounting part below the glove box 7.

After the airbag device 9 has been mounted, when the inflator 20 is activated, the inflation gas G is discharged from the gas discharge port 22a of the gas discharge portion 22. The body portion 11 of the airbag 10 is deployed and inflated by the inflation gas G that has flowed therein through the inflow port portion 12, so that the door portions 72F, 72B of the airbag cover 70 are pushed and opened, and the airbag 10 is positioned in front of the knee of the passenger at the passenger seat.

Then, in the airbag device 9 according to the first embodiment, the inflow port portion 12 that extends from the body portion 11 of the folded airbag 10 is provided between the pressing portions 37, 45 at the rear surface 31b side of the holding plate portion 31 of the attachment base 30 and the support portions 41, 49. The distal end 20a side of the inflator 20 is inserted into the inflow port portion 12, and then the to-be-crimped portions 38, 46 of the pressing portions 37, 45 are plastically deformed by being crimped. Accordingly, the inflow port portion 12 of the airbag 10 into which the distal end 20a side of the inflator 20 is inserted is sandwiched between the crimped pressing portions 37, 45 and the support portions 41, 49, and is assembled to and held by the attachment base 30. In this assembly structure, it is possible to easily assemble the inflow port portion 12 simply by crimping and plastically deforming the pressing portions 37, 45 provided around the inflow port portion 12 without using bolts and nuts.

Therefore, in the airbag device 9 according to the first embodiment, it is possible to reduce the number of components, to reduce weight, and to easily assemble the airbag 10 and the inflator 20 to the attachment base 30 simply by crimping the pressing portions 37, 45.

Then, in the first embodiment, the holding plate portion 31 includes the pressing portion 37 that is provided at the distal end 20a side of the inflator 20, the support portion 41 that is provided so as to be displaced from the pressing portion 37 in a direction along the axial center (the axial direction) IC of the inflator 20, and the second pressing portion 45 configured to be crimped so as to press against the axial center IC side of the inflator 20 to press the inflator 20 against the support portion 41 side. The second pressing portion 45 is provided at a position away from the pressing portion 37 with the support portion 41 therebetween in the direction along the axial center IC of the inflator 20.

Therefore, in the first embodiment, along the axial direction of the inflator 20, the inflator 20 and the inflow port portion 12 of the airbag 10 are supported at a plurality of positions of the two pressing portions 37, 45 and the one support portion 41, so that the inflator 20 and the inflow port portion 12 of the airbag 10 are stably held by the holding plate portion 31 of the attachment base 30.

Without considering the above-described points, the inflator 20 and the inflow port portion 12 of the airbag 10 may be held by the two support portions 41, 49 and the one pressing portion 45 between the support portions 41, 49 such that the inflow port portion 12 extends to an area beyond the pressing portion 45.

Of course, the inflator 20 and the inflow port portion 12 of the airbag 10 may be held by the one pressing portion 37 and the one support portion 41. In this case, the pressing portion 37 and the support portion 41 may be provided at the front end 20a side of the inflator 20 without shifting along the axial center IC of the inflator 20, the inflator 20 and the inflow port portion 12 of the airbag 10 into which the distal end 20a side of the inflator 20 is inserted may be sandwiched by the one pressing portion 37 and the one support portion 41. In this case, the pressing portion 37 may be separately fixed to the holding plate portion 31 by welding or the like without pressing the sheet metal material.

In the first embodiment, the airbag 10 includes the winding portion 15 that is configured to be wound around the inflow port portion 12 into which the distal end 20a side of the inflator 20 is inserted so as to press against an inflator 20 side and that is provided at the inflow port portion 12, and the lock protrusion 59 that is the lock portion configured to lock the lock hole 17 that is the to-be-locked portion provided at the end 16 of the winding portion 15 to maintain the winding state of the winding portion 15. The lock protrusion 59 is provided at the attachment base 30 or the inflator 20 (at the attachment base 30 in the first embodiment).

Therefore, in the first embodiment, if the end 16 formed with the lock hole 17 that is the to-be-locked portion is locked to the lock protrusion 59 that is the surrounding lock portion to prevent the winding portion 15 from loosening (see FIG. 5) and to maintain the winding state, the inflow port portion 12 of the airbag 10 is pressed against the outer peripheral surface 21 of the inflator 20 by the winding portion 15. Therefore, an inner peripheral surface 12b side of the inflow port portion 12 closely adheres to the outer peripheral surface 21 of the inflator 20 to attain good gas sealing performance, so that it is possible to prevent leakage of the inflation gas G accurately even if the pressing portion 37 and the support portion 41 cannot properly seal entire circumference of the outer peripheral surface 21 of the inflator 20 in a circumferential direction of the outer peripheral surface 21.

In the first embodiment, the lock protrusion 59 that is the lock portion is provided at an attachment base 30 side. However, the lock protrusion 59 that is the lock portion may be provided at an outer peripheral surface 21 side of the inflator 20.

Figure 10A:
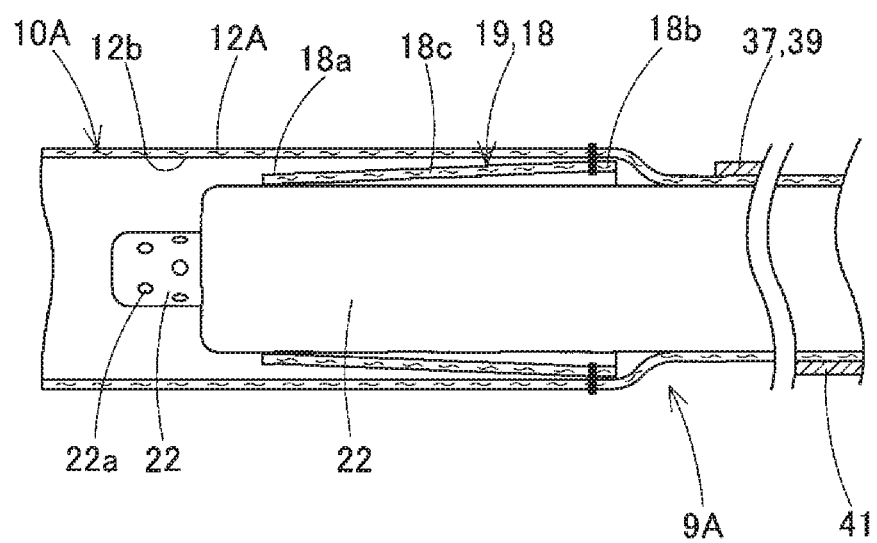
FIGS. 10A to 10C illustrate operation of a case in which a seal material for a check valve is provided at the inflow port portion of the airbag according to the first embodiment.
Figure 10B:
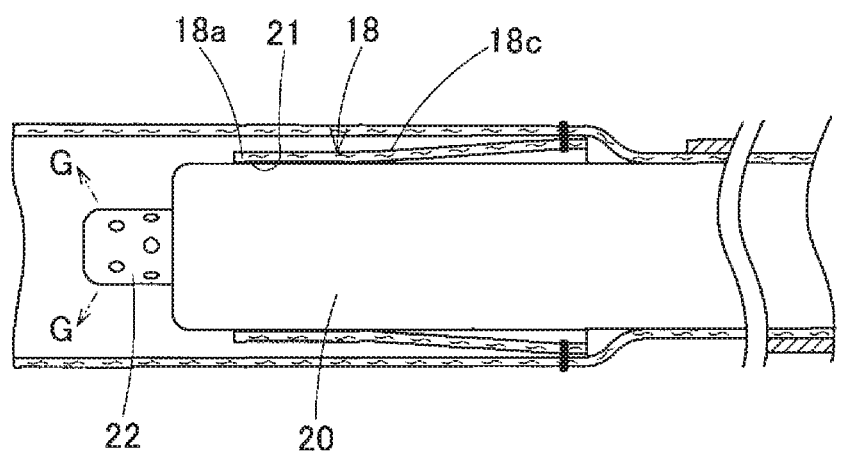
Figure 10C:
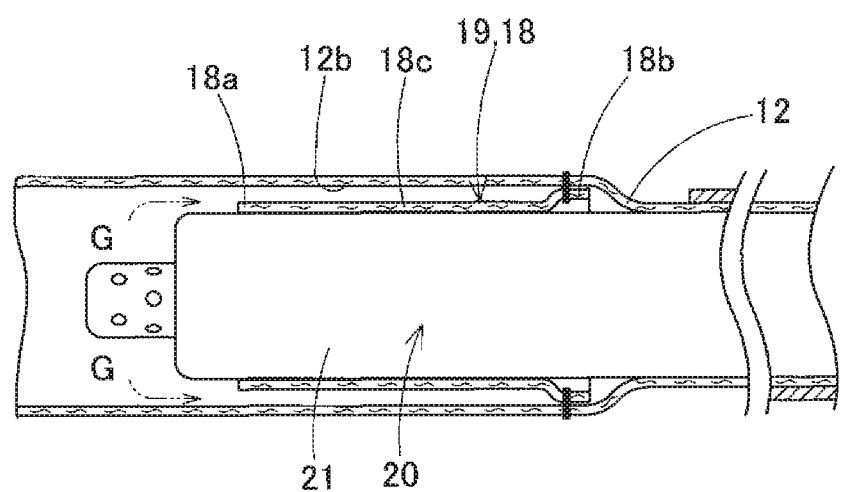

In order to improve the gas sealing performance of the outer peripheral surface 21 side of the inflator 20, an airbag device 9A illustrated in FIGS. 10A to 10C may be used. In the airbag device 9A, the airbag 10A includes, at the inner peripheral surface 12b side of an inflow port portion 12A, a flexible sheet member 18 for a check valve that closely adheres to the outer peripheral surface 21 of the inflator 20 by pressure of the inflation gas G to flow out so as to prevent the inflation gas G discharged from the gas discharge portion 22 of the inflator 20 from flowing out of the inflow port portion 12A. In the sheet member 18, an inner diameter dimension of a distal end 18a side of a gas discharge portion 22 side is smaller than that of a base portion 18b side away from the gas discharge portion 22.

Therefore, the airbag device 9A includes a check valve 19 formed of the sheet member 18 provided at the inner peripheral surface 12b side of the inflow port portion 12A of the airbag 10A. Even if the pressing portion 37 and the support portion 41 cannot seal the entire circumference of the outer peripheral surface 21 of the inflator 20 in the circumferential direction, as illustrated in B, C in FIGS. 10A to 10C, a vicinity of an intermediate portion 18c from a distal end 18a of the sheet member 18 that is the check valve 19 closely adheres to the outer peripheral surface 21 of the inflator 20 by pressure of the inflation gas G to flow out so as to attain good gas sealing performance, so that it is possible to prevent the leakage of the inflation gas G accurately.

In the first embodiment, the support portion 41 of the holding plate portion 31 includes the bead 43 that protrudes from the surrounding general portion 42 and is pressed against the inflow port portion 12 into which the distal end 20a side of the inflator 20 is inserted.

Figure 5:
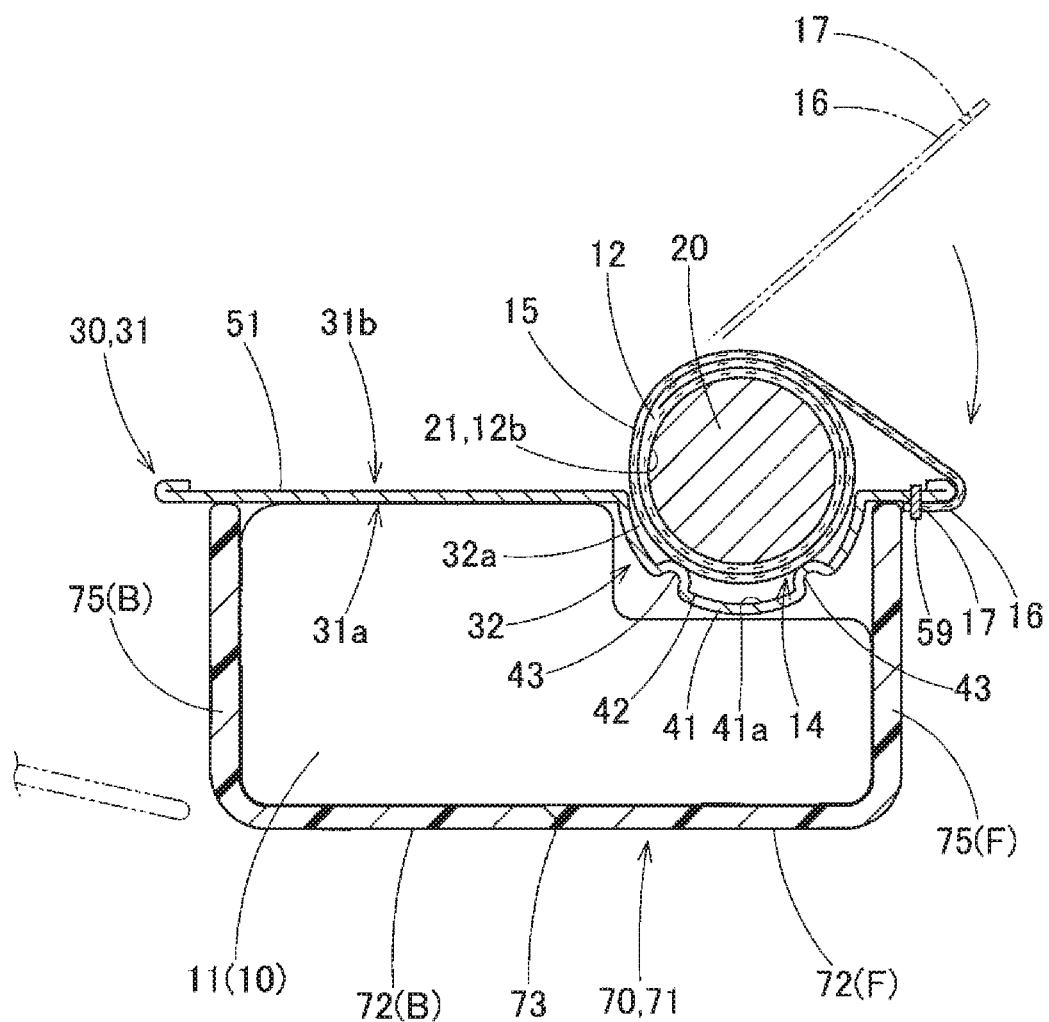
FIG. 5 is a schematic longitudinal sectional view of the airbag device according to the first embodiment, and corresponds to a V-V part in FIG. 4.
Figure 6:
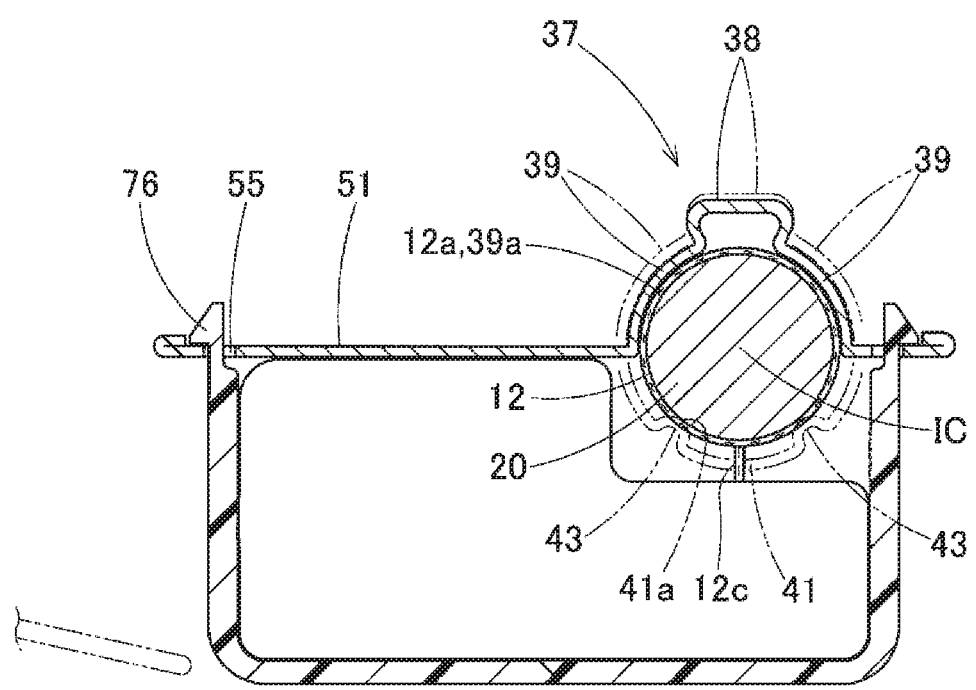
FIG. 6 is a schematic longitudinal sectional view of the airbag device according to the first embodiment and corresponds to a VI-VI part in FIG. 4.
Figure 7:
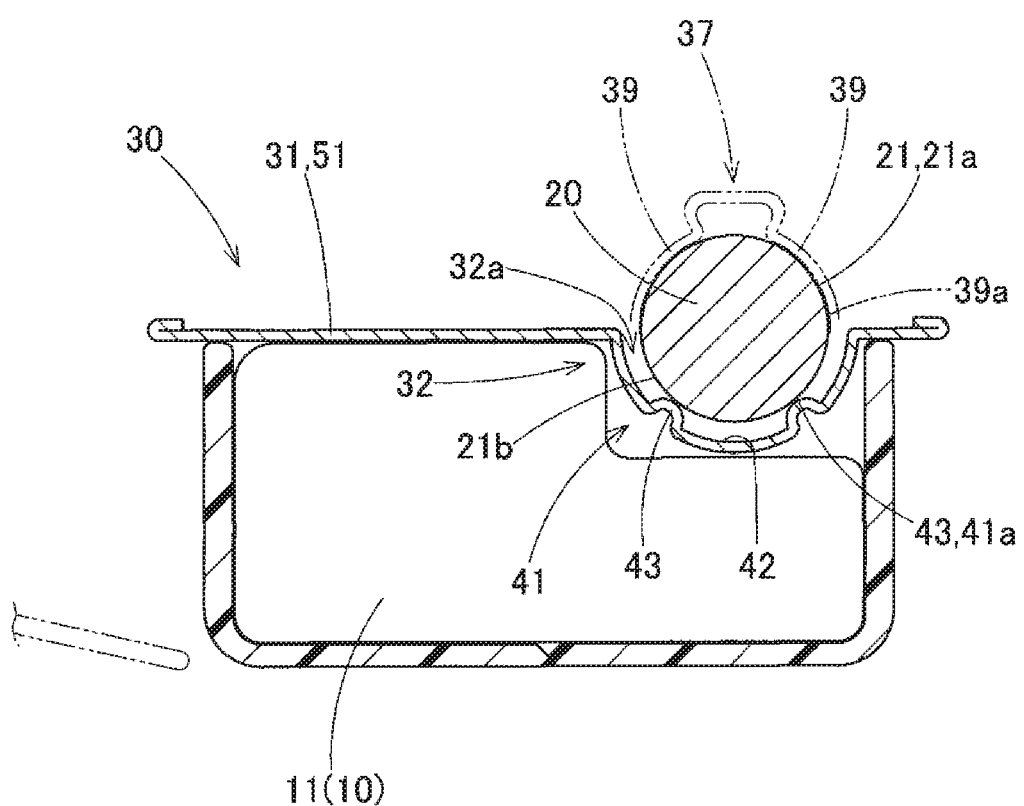
FIG. 7 is a schematic longitudinal sectional view of the airbag device according to the first embodiment, and corresponds to a VII-VII part in FIG. 4.

Therefore, in the first embodiment, as illustrated in FIG. 5, a sandwiching part 14 of the inflow port portion 12 to be pressed is a narrow area and is at a fixed position without displacement, so that it is possible to stabilize the support performed by the support portion 41 of the inflator 20 and the inflow port portion 12 for each airbag device 9.

Figure 11A:
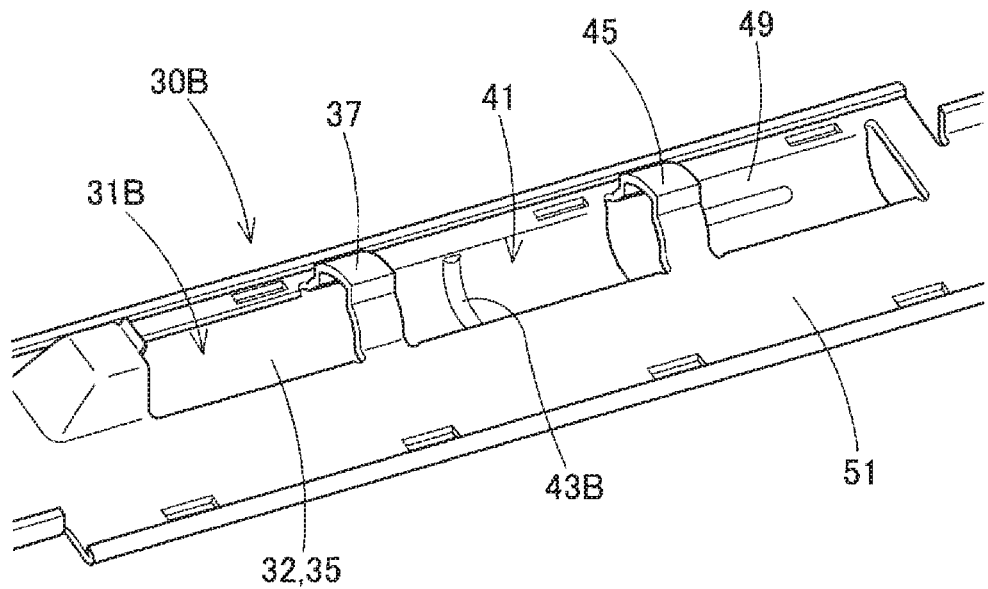
FIGS. 11A and 11B illustrate a modification of a bead provided at a holding plate portion of an attachment base according to the first embodiment.
Figure 11B:
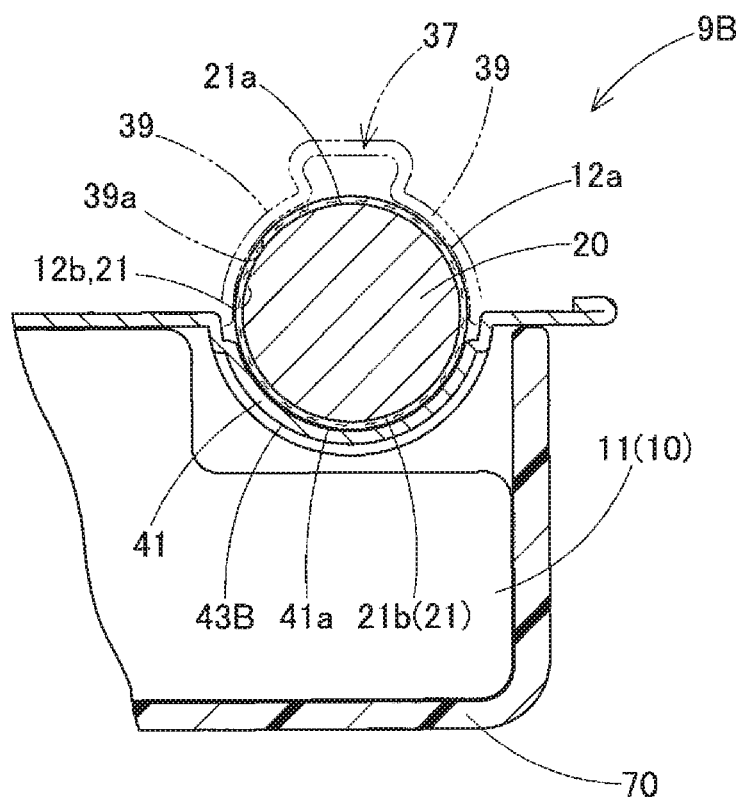

In the first embodiment, a plurality of the beads 43 are provided separately around the axial center IC of the inflator 20, and extend long along the axial center IC of the inflator 20. However, as the airbag device 9B illustrated in FIGS. 11A and 11B, beads 43B provided at a holding plate portion 31B of an attachment base 30B are provided along a circumferential direction of the outer peripheral surface 21 of the inflator 20. Accordingly, it is possible to press the inflow port portion 12 against the lower side 21b of the outer peripheral surface 21 along the circumferential direction of the inflator 20 using the beads 43B, and to improve the gas sealing performance of the inflow port portion 12 by cooperating with an inner peripheral surface 39a part of the reduced diameter portion 39 of the pressing portion 37 to be crimped.

Figure 12:
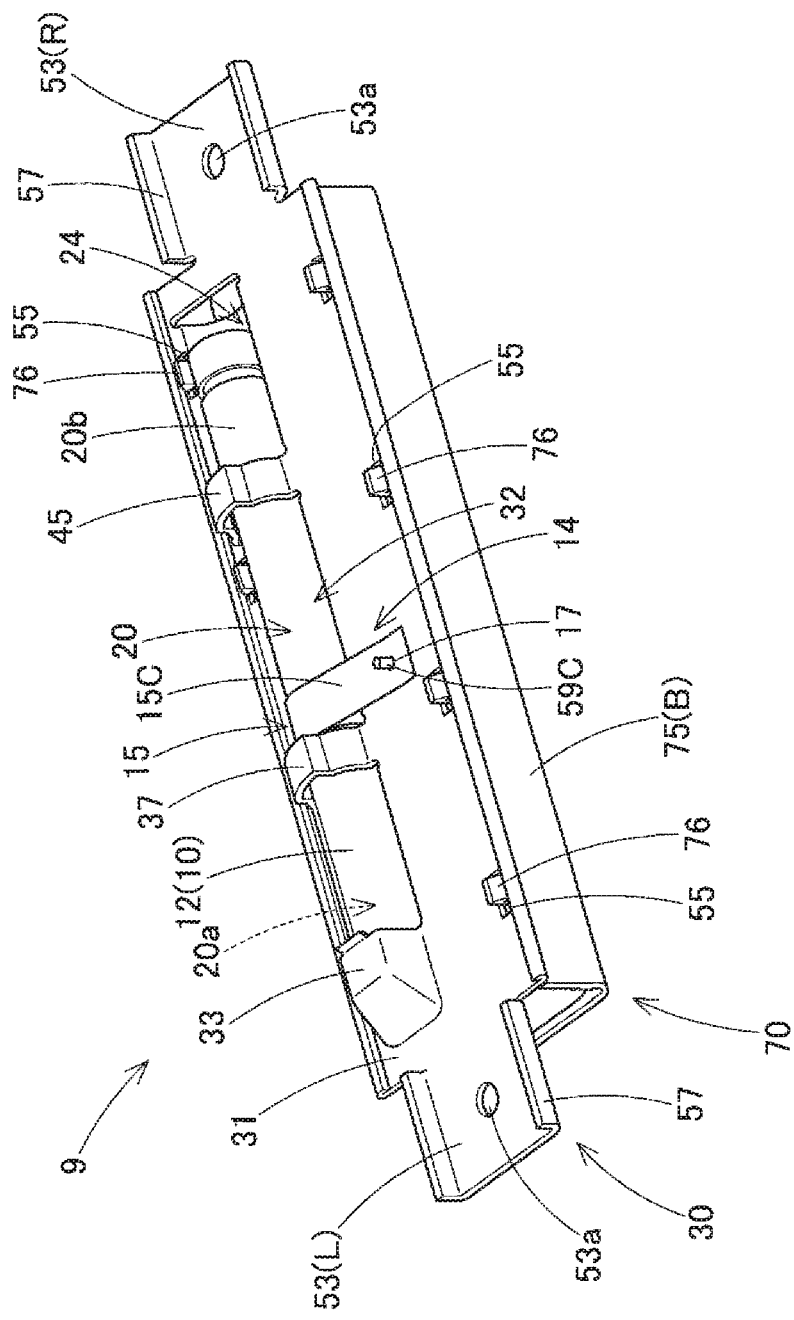
FIG. 12 illustrates a modification of the winding portion in the airbag according to the first embodiment.
Figure 13:
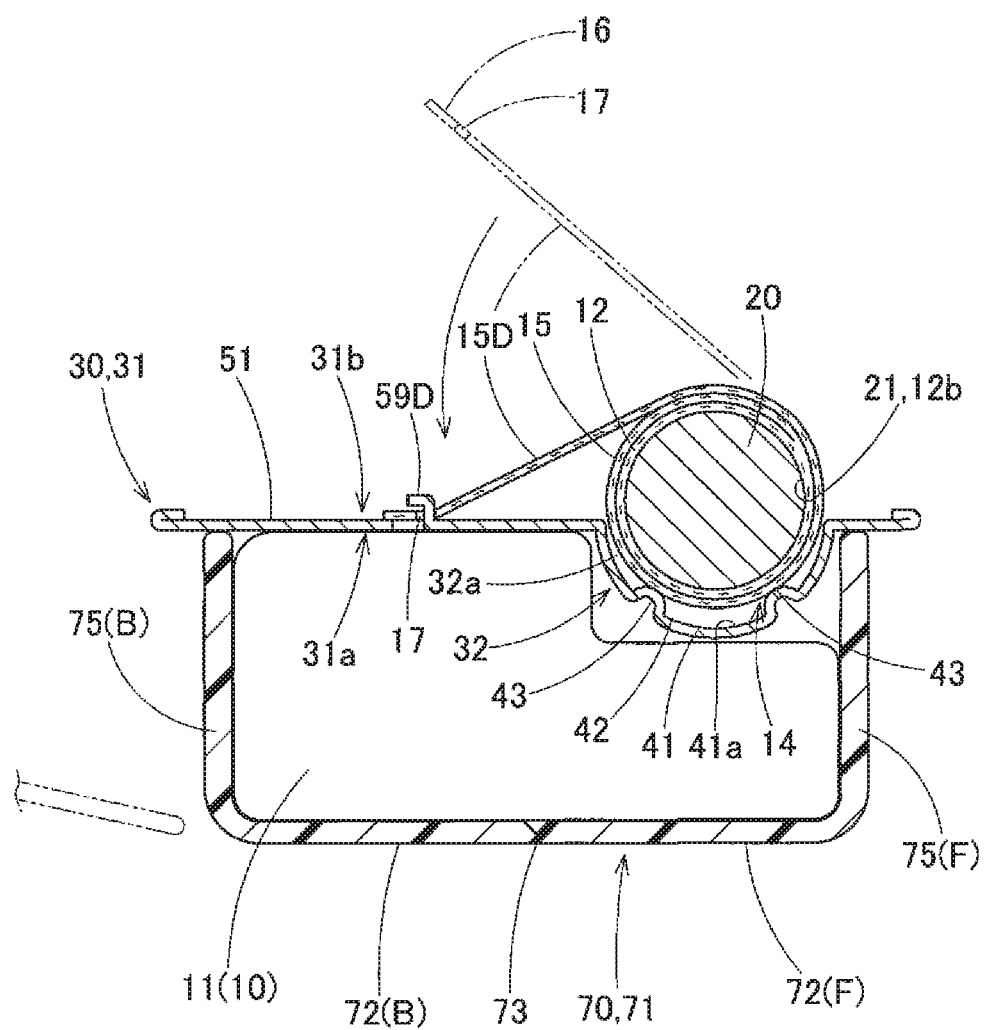
FIG. 13 illustrates another modification of the winding portion in the airbag according to the first embodiment.

In the first embodiment, the winding portion 15 provided at the inflow port portion 12 of the airbag 10 is locked to the lock protrusion 59 provided at a front edge side of the support seat 51 to maintain the winding state of the winding portion 15. However, as illustrated in FIG. 12, a lock protrusion 59C that is a lock portion provided at the support seat 51 at a front side of the inflator 20 may be inserted into the lock hole 17 of the end 16 to lock a winding portion 15C to the lock protrusion 59C so as to maintain the winding state of the winding portion 15C. The lock protrusion 59C may be formed by a pin, a bolt, or the like provided at the support seat 51. Alternatively, as illustrated in FIG. 13, a lock protrusion 59D may be formed by performing cutting and raising from the support seat 51, and the lock protrusion 59D that is a lock portion may be inserted into the lock hole 17 that is the to-be-locked portion of the end 16 of a winding portion 151) to lock the winding portion 15D to the lock protrusion 59D so as to maintain the winding state of the winding portion 15D.

In the first embodiment, the knee protection airbag device 9 configured to protect the knee of the passenger at the passenger seat has been described. However, in the airbag device, as long as the inflator is inserted into the inflow port portion of the airbag and the airbag and the inflator are assembled to the attachment base, the airbag device is not limited to the knee protection airbag device. The present invention may be applied to a passenger airbag device or the like configured to protect an upper body of the passenger at the passenger seat.

Figure 14:
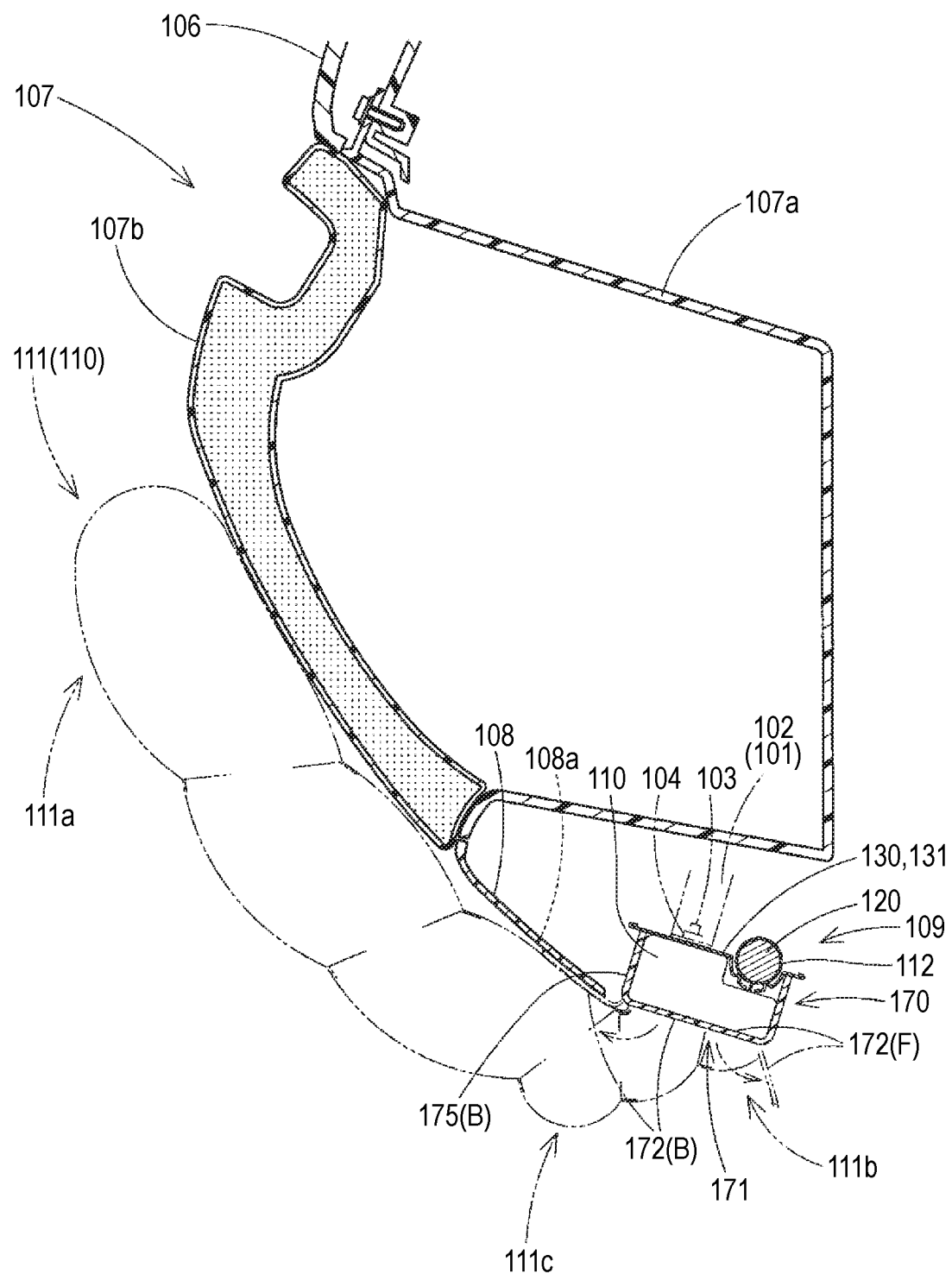
FIG. 14 is a schematic longitudinal sectional view illustrating a state in which a knee protection airbag device according to a second embodiment of the present invention is mounted in a vehicle.

Hereinafter, a second embodiment of the present invention will be described with reference to the drawings. As illustrated in FIG. 14, an airbag device 109 according to the second embodiment is for knee protection. The airbag device 109 is mounted at a lower side of an instrument panel 106 in front of a passenger seat, and specifically below a glove box 107 provided at the lower side of the instrument panel 106. The glove box 107 includes a box body 107a and a door portion 107b that closes rear of the box body 107a, and the door portion 107b is openable so as to rotate an upper edge side of the door portion 107b rearward. An under cover 108 is provided below the glove box 107, and a door arrangement wall portion 171 of an airbag cover 170 (described below) in the airbag device 109 is provided at an opening 108a of the under cover 108. The airbag device 109 is mounted at the lower side in front of the passenger seat.

As illustrated in FIGS. 14 to 21, the airbag device 109 includes an airbag 110 configured to inflate from a folded state by allowing inflation gas to flow therein so as to protect a knee of an occupant seated on a passenger seat, an inflator 120 configured to supply inflation gas G (see FIG. 17) to the airbag 110, an attachment base 130 configured to hold the airbag 110 and the inflator 120 and to be attached to a front lower side of the passenger seat that is a mounting part, and an airbag cover 170 configured to cover the folded airbag 110 and to be held by the attachment base 130.

Figure 15:
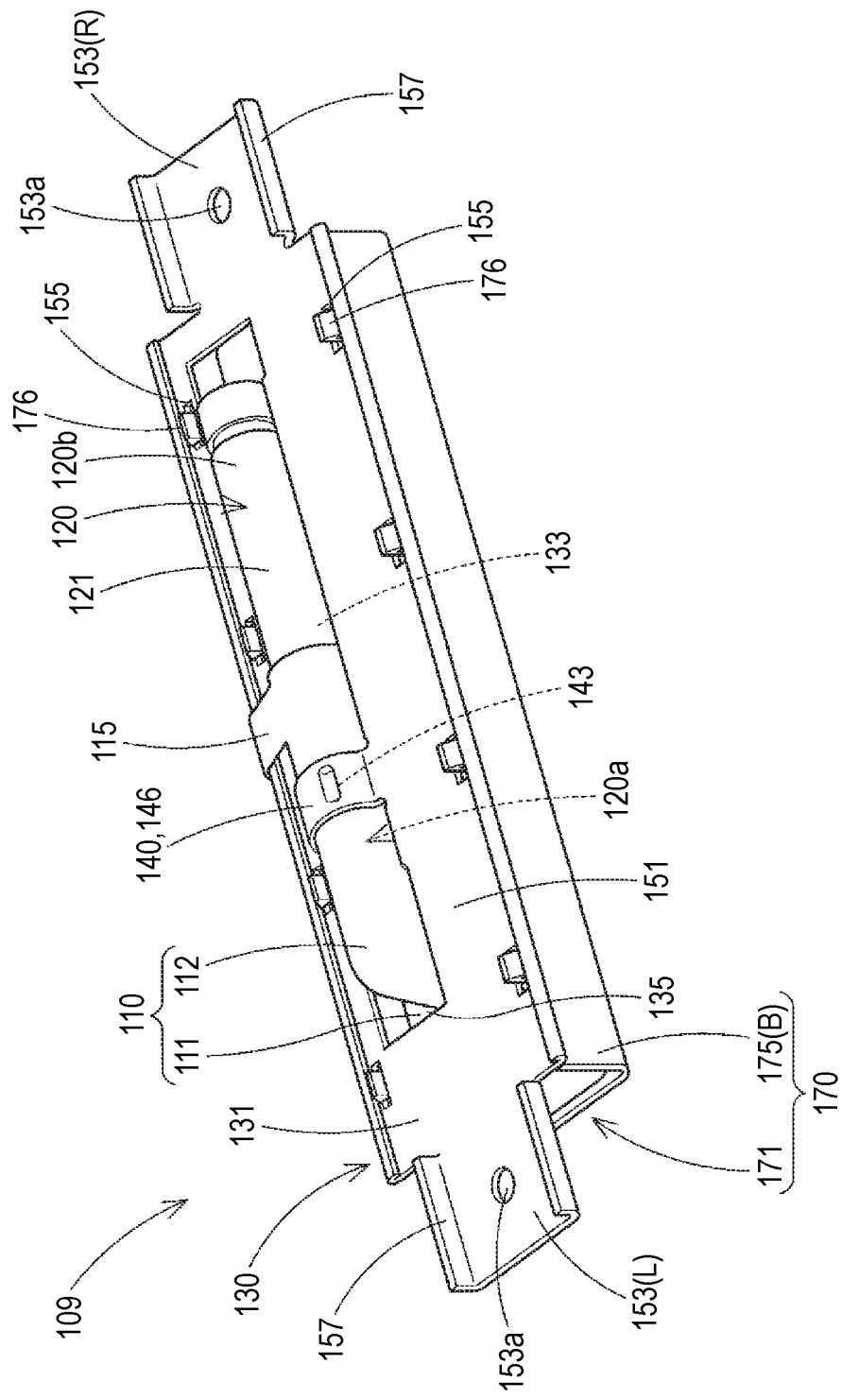
FIG. 15 is a schematic perspective view of the airbag device according to the second embodiment as viewed from a back surface side (an upper surface side) of the airbag device.
Figure 16:
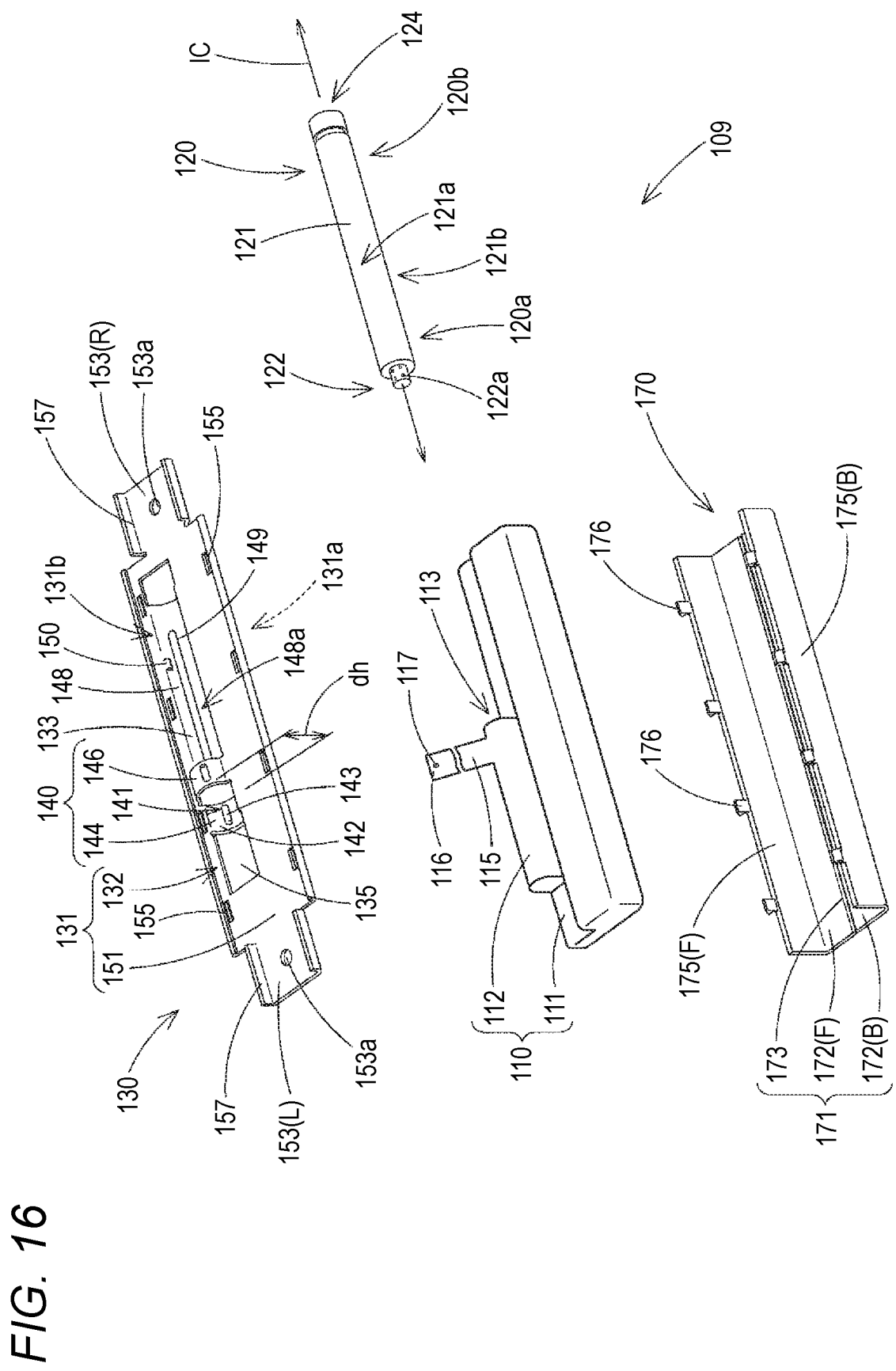
FIG. 16 is a schematic exploded perspective view of the airbag device according to the second embodiment.
Figure 17:
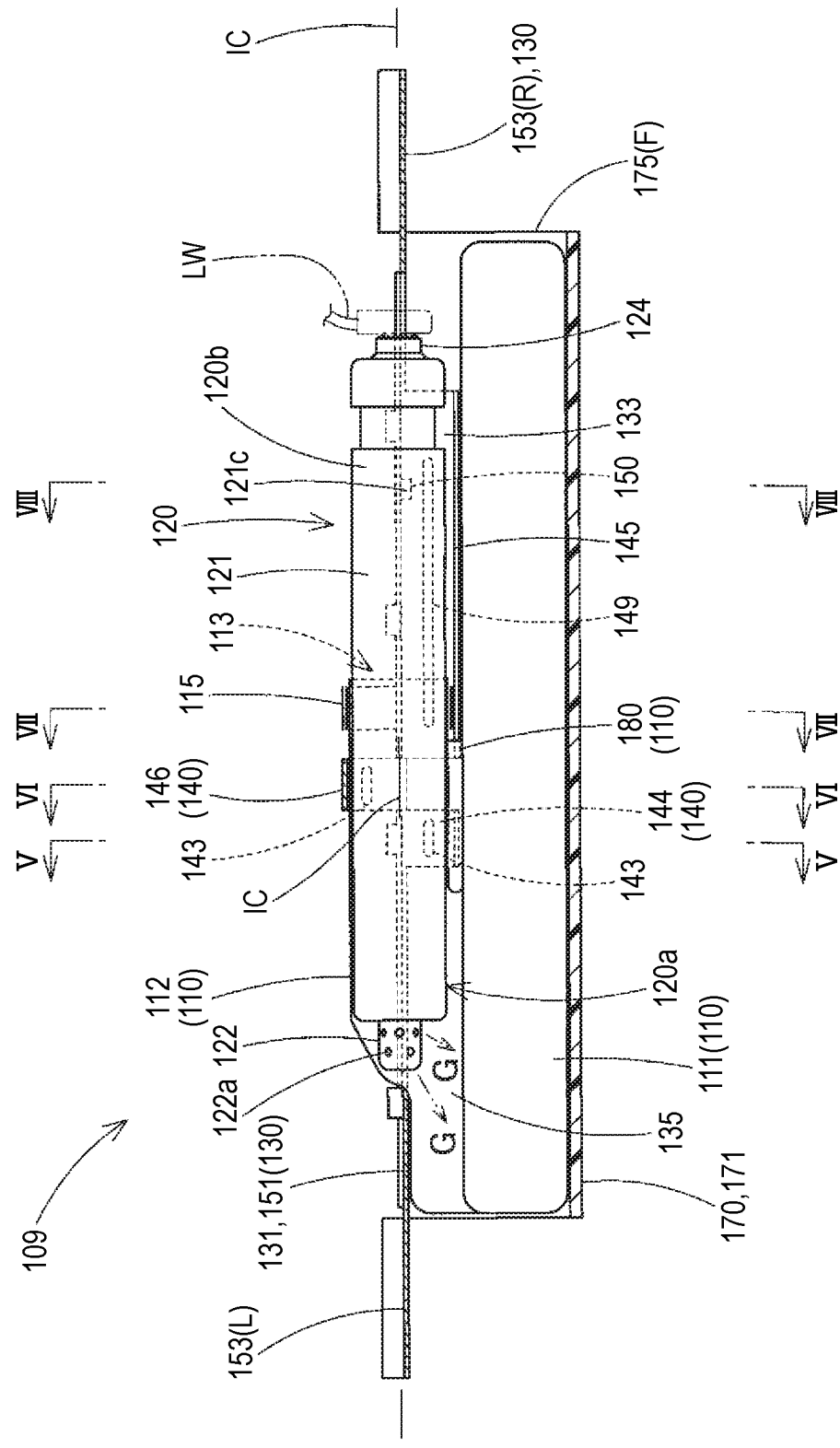
FIG. 17 is a schematic longitudinal sectional view of the airbag device according to the second embodiment, taken along the left-right direction.
Figure 18:
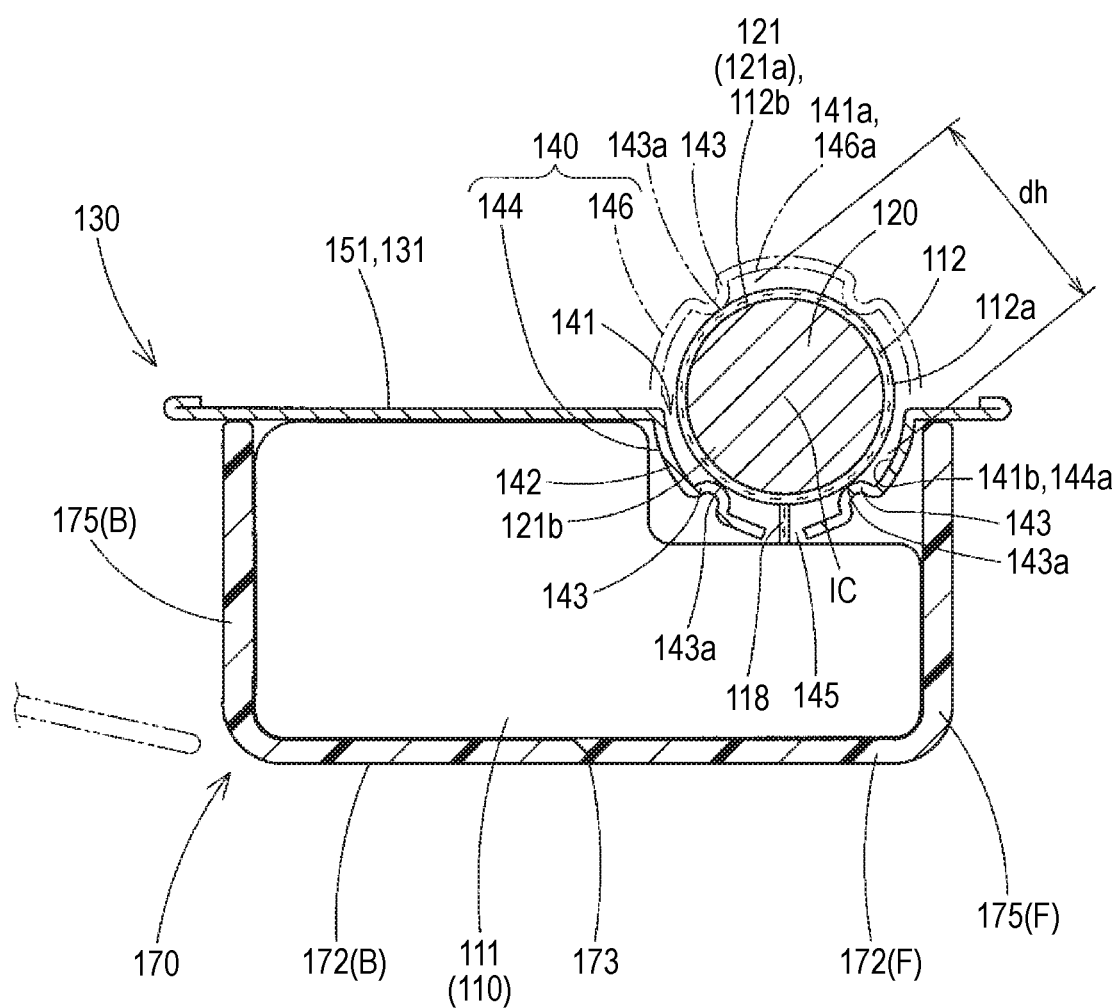
FIG. 18 is a schematic longitudinal sectional view of the airbag device according to the second embodiment, and corresponds to a V-V part in FIG. 17.
Figure 19:
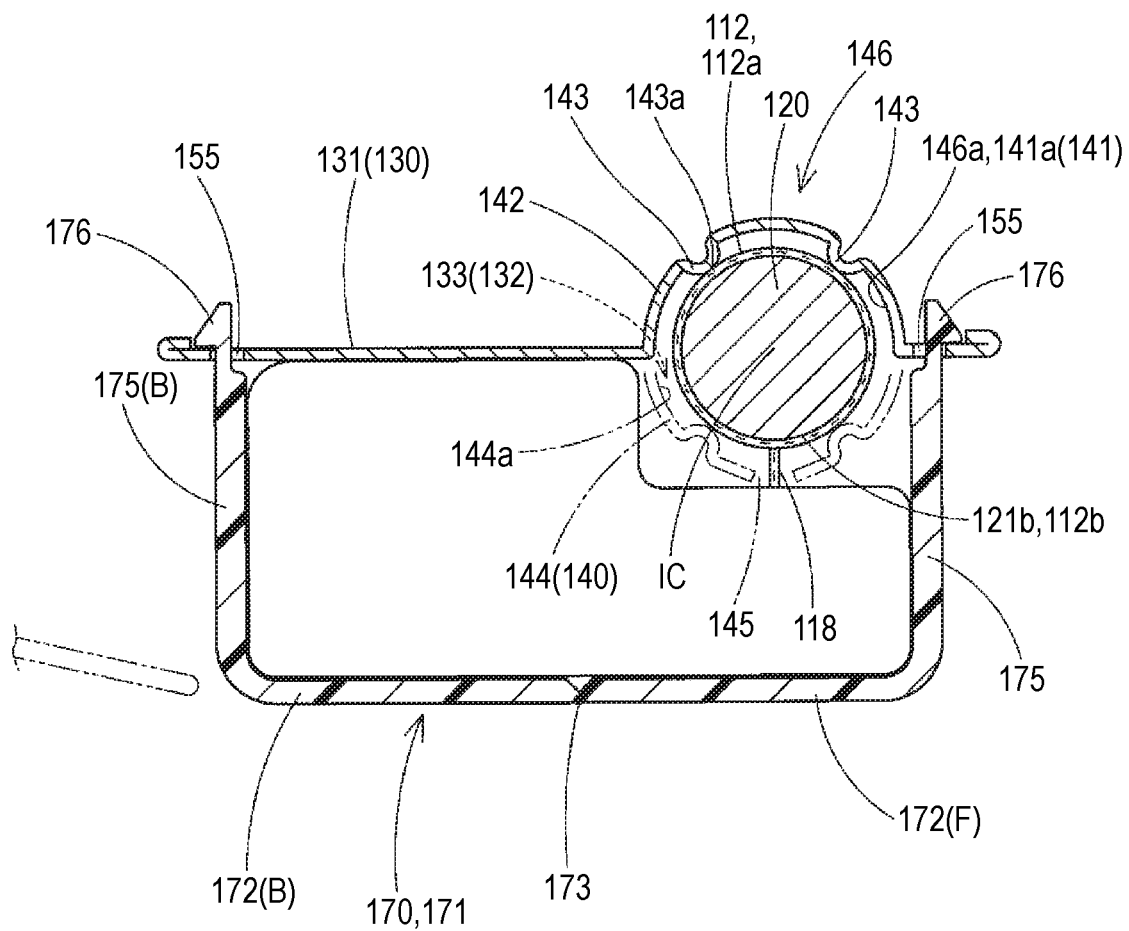
FIG. 19 is a schematic longitudinal sectional view of the airbag device according to the second embodiment, and corresponds to a VI-VI part in FIG. 17.

A front-rear direction, an upper-lower direction, and a left-right direction in the present specification each correspond to directions in a state in which the airbag device is mounted in the vehicle. As illustrated in FIGS. 14 to 16, a longitudinal direction of a substantially rectangular holding plate portion 131 of the attachment base 130 is the left-right direction, a short length direction is the front-rear direction, and a direction orthogonal to the holding plate portion 131 is the upper-lower direction.

As illustrated in FIGS. 14, 16, 17 and 22, the airbag 110 includes a body portion 111 configured to inflate from a folded state by allowing the inflation gas G to flow therein, and a cylindrical (in the second embodiment, cylindrical) inflow port portion 112 which is communicated with the body portion 111, into which a distal end 120a side of the inflator 120 is inserted, and which is configured to allow inflation gas from the inflator 120 to flow into the body portion 111. A forming material of a peripheral wall of the body portion 111 extends from an inflow port portion 112 side of the body portion 111, and a connection sheet portion 118 that connects the body portion 111 and the inflow portion 112 is provided at the inflow port portion 112 side (see FIGS. 17 to 19). It is possible to reduce left-right swings of the body portion 111 during inflation as much as possible by the connection sheet portion 118 that is held by the attachment base 130 and extends from the inflow port portion 112 side.

As illustrated by a two-dot chain line in FIG. 14, during inflation, the body portion 111 pushes and opens door portions 172 (F, B) (described below) of the airbag cover 170 to protrude rearward and upward from the attachment base 130 and inflate in a substantially rectangular plate shape in front of left and right knees of the occupant, along the undercover 108, the door portion 107b, and left and right parts of the door portion 107b at the instrument panel 106. The body portion 111 at a completion of the inflation includes a lower part 111b that protrudes downward from the attachment base 130, a reversing part 111c that reverses upward from the lower part 111b, and an upper part 111a provided in front of the knee of the occupant.

In the inflow port portion 112, a winding portion 115 is provided in a vicinity of an opening 113 of an end. The winding portion 115 is formed integrally (integrally woven or integrally formed by suturing the winding portion 115 to the inflow port portion 112 separately) with a material (bag base fabric woven from a synthetic fiber that is polyester, polyamide, or the like) of the inflow port portion 112 of the airbag 110, and has a flexible band shape so as to be windable around an outer peripheral surface 112a side of the inflow port portion 112 into which the distal end 120a side of the inflator 120 is inserted. An end (a distal end) 116 of the winding portion 115 is formed with a lock hole 117 that is a to-be-locked portion configured to allow a lock protrusion 159 (see FIG. 20) that is a lock portion provided at the attachment base 130 to insert therein so as to maintain a winding state of the winding portion 115 wound around the inflow port portion 112.

The body portion 111 of the airbag 110 in the folded state is provided at a front surface (a lower surface) 13.1a side of a holding plate portion 131 (described below) of the attachment base 130, and the inflow port portion 112 extending from the body portion 111 is provided at a back surface (an upper surface) side of the holding plate portion 131 through an insertion hole 135 (described below) of the holding plate portion 131. The inflow port portion 112 inserted through the insertion hole 135 is assembled to and held by the holding plate portion 131 together with the inflator 120 in a state in which the distal end 120a side of the inflator 120 is inserted therein.

The inflator 120 has a substantially columnar shape, and includes a gas discharge portion 122 formed with a plurality of gas discharge ports 122a configured to allow the inflation gas G to be discharged therethrough at a distal end 120a. A connector 124 that connects an actuation signal line LW configured to input an actuation signal is provided at an end surface of the inflator 120 on a base portion 120b side (see FIG. 17).

The attachment base 130 is formed of sheet metal that is a steel plate or the like, and includes the substantially rectangular plate-shaped holding plate portion 131. The holding plate portion 131 includes an assembly seat 132 configured to assemble the inflow port portion 112 of the airbag 110 and the inflator 120 at a front edge side of the holding plate portion 131 along the left-right direction, and a periphery of the assembly seat 132 has a substantially flat plate shape and is a support seat 151 configured to support the body portion 111 of the folded airbag 110.

The assembly seat 132 is formed with a concave part 133 that is recessed downward in a halved columnar shape so as to house the inflow port portion 112 of the airbag 110 and the inflator 120. The concave part 133 is capable of housing substantially halves of the inflow port portion 112 in the state in which the distal end 120a side of the inflator 120 is inserted therein and the inflator 120 in a direction orthogonal to an axis.

The assembly seat 132 includes a press-fit holding portion 140 configured to assemble and hold the inflator 120 and the inflow port portion 112. In the press-fit holding portion 140 according to the second embodiment, the inflow port portion 112 that extends from the body portion 111 through the insertion hole 135 is provided at an inner peripheral side of the press-fit holding portion 140 The press-fit holding portion 140 has a substantially cylindrical shape, and includes an inner peripheral surface 141 having an inner diameter (see FIGS. 16 and 18) dh at which the distal end 120a side of the inflator 120 can be press-fitted into the inflow port portion 112 and having the inner diameter dh at which the inflow port portion 112 into which the distal end 120a side of the inflator 120 is inserted can be held after the press-fitting.

In particular, the press-fit holding portion 140 according to the second embodiment includes halved annular bodies 144, 146 that are divided into a concave part 133 side and a side covering a concave part 133 around the axial center IC of the inflator 120, and the two halved annular bodies 144, 146 are provided at positions displaced along the axial center (the axial direction) IC of the inflator 120. A plurality of beads 143, which protrude from a surrounding general portion 142 and are pressed against the outer peripheral surface 112a side of the inflow port portion 112 in the state in which the distal end 120a side of the inflator 120 is inserted therein, are provided at an inner peripheral surface 141 side of the press-fit holding portion 140.

Then, the lower halved annular body 144 is provided adjacent to the insertion hole 135, and includes the beads 143 extending along the axial center IC of the inflator 120 at two positions in the front-rear direction at an inner peripheral surface 144a side. The upper halved annular body 146 is displaced from the halved annular body 144 in a direction away from the insertion hole 135, and includes the beads 143 extending along the axial center IC of the inflator 120 at two positions in the front-rear direction at an inner peripheral surface 146a side.

In the press-fit holding portion 140 including the halved annular bodies 144, 146, the halved annular body 144 is a lower side 141b of the inner peripheral surface 141, and the halved annular body 146 is an upper side 141a of the inner peripheral surface 141. The inner diameter dh of the press-fit holding portion 140 is defined by the inner peripheral surface 141 formed by connecting top parts 143a of the beads 143 provided at inner peripheral surface 144a, 146a sides of the halved annular bodies 144, 146.

The lower halved annular body 144 is formed with a slit 145 that extends in the front-rear direction. A connection seat portion 118 of the airbag 110 is provided in the slit 145.

A part of the concave part 133 of the assembly seat 132 away from the insertion hole 135 is a halved cylindrical support portion 148, and is configured to support a lower side 1211) of the outer peripheral surface 121 at the base portion 120b side away from the gas discharge portion 122 at the front end 120a side of the inflator 120. Similarly to the press-fit holding portion 140, the support portion 148 includes beads 149 that protrude along the axial center IC of the inflator 120 and are spaced apart from each other in the front-rear direction, and the support portion 148 is configured to support the lower side 121b of the outer peripheral surface 121 of the inflator 120 by top parts 149a of the beads 149. The support portion 148 is also formed with the slit 145 along the axial center IC of the inflator 120 (see FIG. 21).

The support portion 148 includes, at an upper edge side of the concave portion 133, lock claw portions 150, 150 that are configured to press against side surface portions 121c, 121c facing each other at front and rear of the outer peripheral surface 121 of the inflator 120 in the direction orthogonal to the axis so as to sandwich the side surface portions 121c, 121c.

As described above, the assembly seat 132 includes, sequentially from the left end side of the assembly seat 132, the insertion hole 135, the lower halved annular body 144, the upper halved annular body 146, and the support portion 148 along the axial center (the axial direction) IC of the inflator 120 to be assembled. It is possible to easily form the holding plate portion 131 including the assembly seat 132 by forming holes, concave parts, and convex parts by performing pressing operation on a flat sheet metal material.

Attachment bracket portions 153 (L, R) configured to attach the airbag device 109 to the mounting part are formed at both left and right sides of the holding plate portion 131 of the attachment base 130. The attachment bracket portions 153 (L, R) are formed with attachment holes 153a penetrating therethrough, and the airbag device 109 can be mounted at a front lower side of the passenger seat below the glove box 107 by fastening the bolts 103 passing through the attachment holes 153a to the bracket 102 at a body 101 side with nuts 104. Reinforcing ribs 157 protrude upward from front and rear edges of the attachment bracket portions 153 (L, R).

In the attachment base 130, connection concave parts 155 configured to allow connection convex parts 176 of the airbag cover 170 to be inserted therein and to connect and hold the connection convex parts 176 are opened at front and rear edges of the support seat 151.

Figure 20:
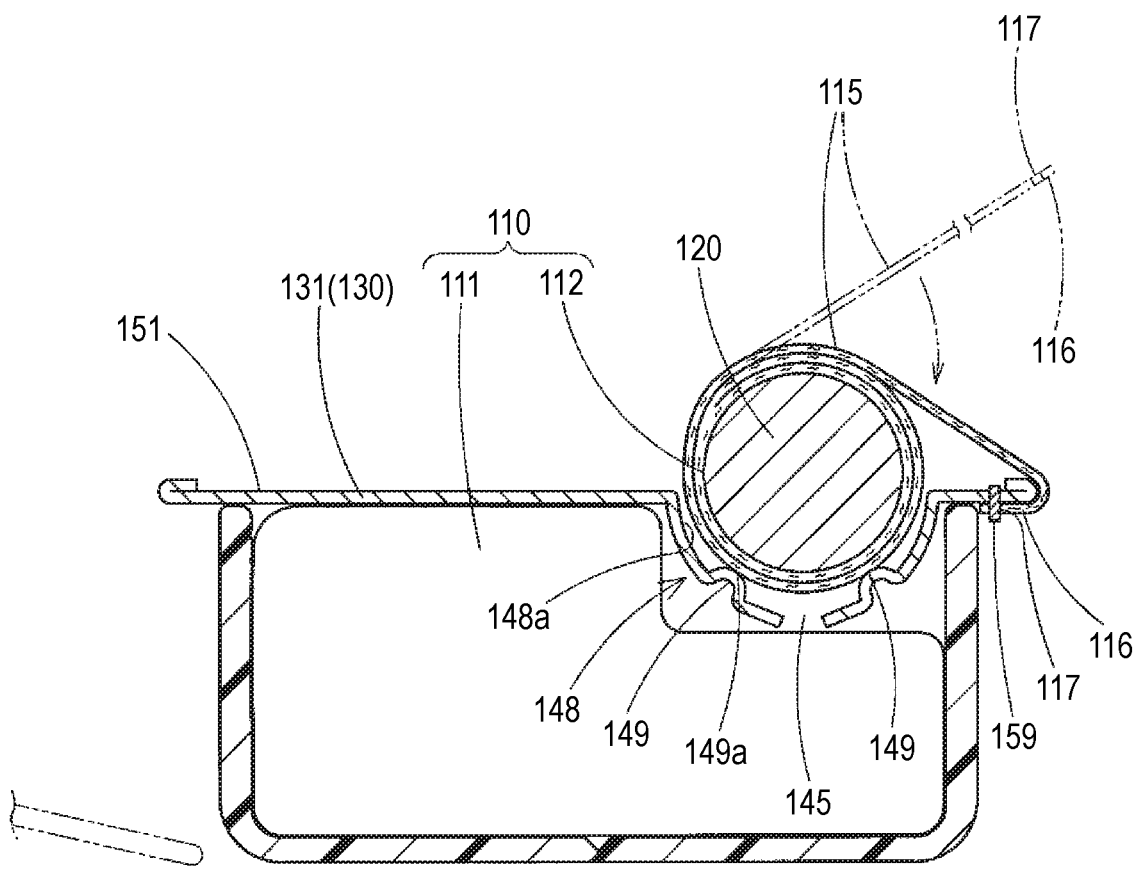
FIG. 20 is a schematic longitudinal sectional view of the airbag device according to the second embodiment, and corresponds to a VII-VII part in FIG. 17.
Figure 21:
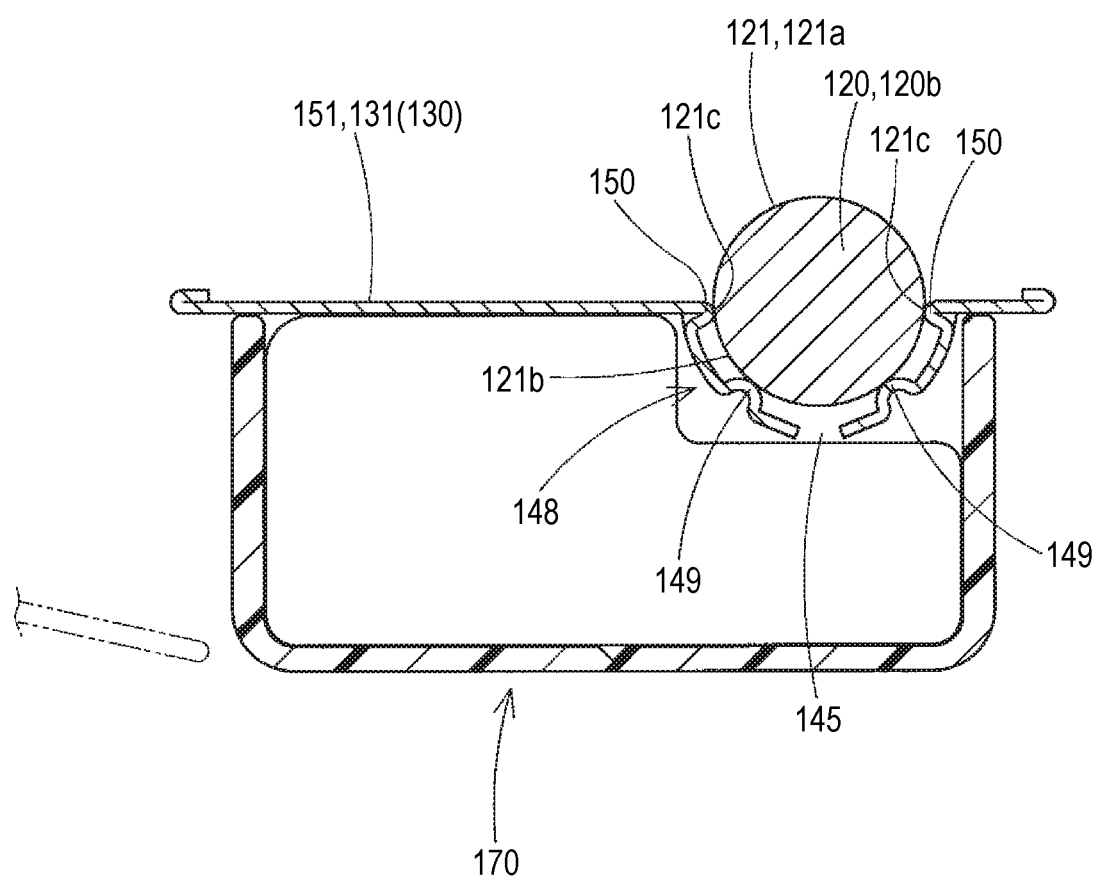
FIG. 21 is a schematic longitudinal sectional view of the airbag device according to the second embodiment, and corresponds to a VIII-VIII part in FIG. 17.
Figure 22:
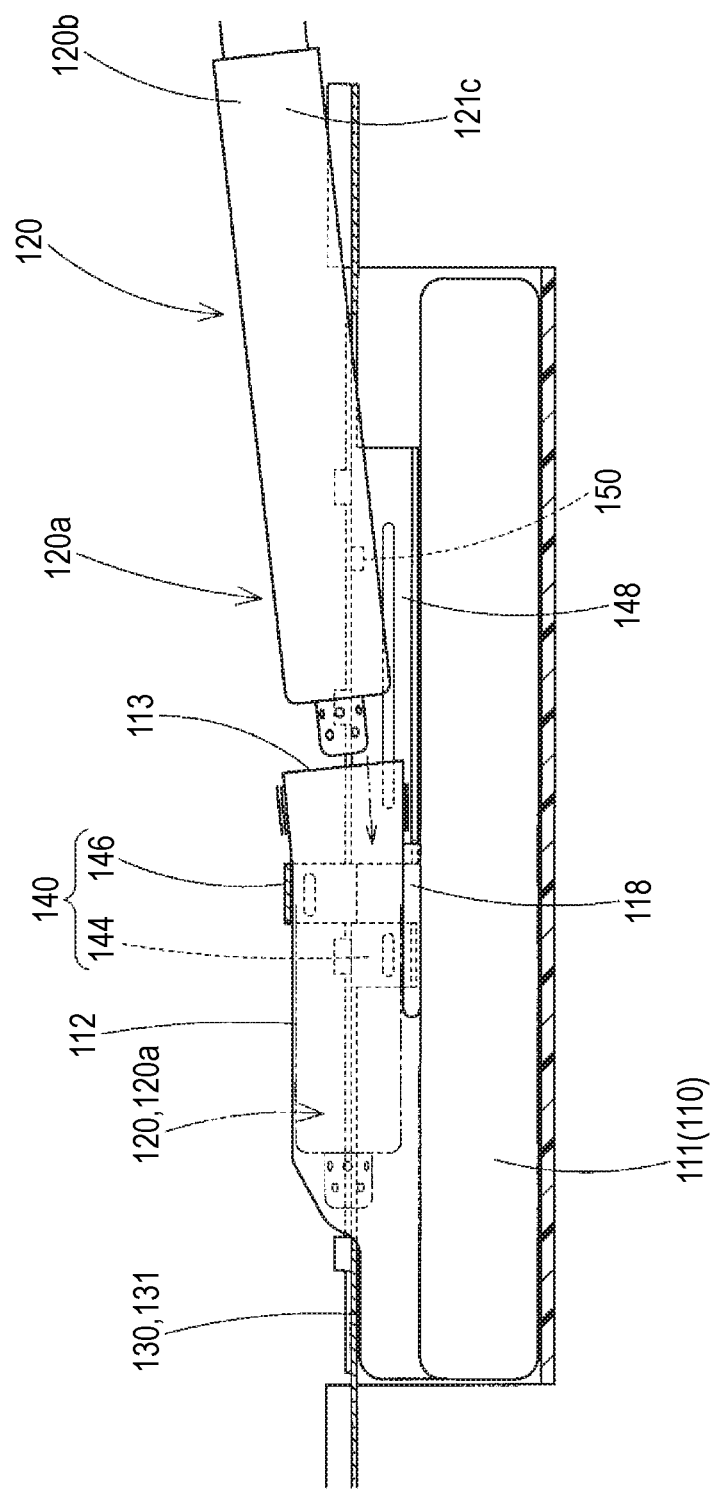
FIG. 22 illustrates a state in which the inflow port portion of the airbag is provided in a press-fit holding portion of the attachment base according to the second embodiment and a distal end side of the inflator is inserted therein.

In a vicinity of the halved annular body 146 on an upper surface side of the support seat 151, the lock protrusion 159 that is the lock portion protrudes to lock an end 116 by being inserted into the lock hole 117 that is the to-be-locked portion of the end 116 of the winding portion 115 (see FIG. 20).

As illustrated in FIGS. 16 to 21, the airbag cover 170 is formed of a synthetic resin that is a polyolefin-based thermoplastic elastomer or the like, and includes a rectangular plate-shaped door arrangement wall portion 171 and connection wall portions 175 (F, B) that extend upward from front and rear edges of the door arrangement wall portion 171. The door arrangement wall portion 171 includes a thin breakable portion 173 along the left-right direction, and door portions 172 (F, B) configured to open forward and rearward by breaking the breakable portion 173 when the body portion 111 of the airbag 110 is inflated. The front and rear connection wall portions 175 (F, B) include, at upper ends thereof, a plurality of the connection convex parts 176 configured to be inserted and locked in the connection concave parts 155 of the attachment base 130.

In terms of assembly operation of the airbag device 109 according to the second embodiment, first, the body portion 111 of the airbag 110 is folded and wrapped with a wrapping material (not illustrated) for preventing collapse. Next, the body portion 111 of the airbag 110 is provided at the front surface 131a side of the holding plate portion 131 of the attachment base 130, and the inflow port portion 112 is taken out to the back surface 131b side of the holding plate portion 131 through the insertion hole 135. The connection convex portions 176 of the connection wall portion 175F, 175B are inserted and locked in the corresponding connection concave portions 155 of the holding plate portion 131 so as to cover the body portion 111 by the airbag cover 170.

Then, the inflow port portion 112, into which the insertion hole 135 is inserted, is inserted into inner peripheral sides of the halved annular bodies 144, 146 of the press-fit holding portion 140. In this case, the connection sheet portion 118 of the airbag 110 is inserted into the slit 145 of the halved annular body 144, and the winding portion 115 is loosely wound around the inflow port portion 112 (see FIG. 22). Then, the distal end 120a side of the inflator 120 is inserted into the inner peripheral surface 112b side of the inflow port portion 112 from the opening 113 of the inflow port portion 112. The distal end 120a side of the inflator 120 is press-fitted into the press-fit holding portion 140 including the halved annular bodies 146, 144 up to a predetermined position illustrated by a two-dot chain line in FIG. 22, between the lock claws 150, 150. The base portion 120b side of the inflator 120 is fitted between the lock claw portions 150, 150 and is provided at an inner peripheral side of the support portion 148. Then, the press-fitting holding portion 140 has the inner diameter dimension dh at which the inflow port portion 112 into which the distal end 120a side of the inflator 120 is inserted after the press-fitting can be held. Therefore, the inflow port portion 112 of the airbag 110 and the distal end 120a side of the inflator 120 that is inserted into inflow port portion 112 are assembled to the holding plate portion 131 of the attachment base 130 using the press-fit holding portion 140 so as to be held, so that the airbag device 109 can be assembled. In the second embodiment, after the inflator 120 and the inflow port portion 112 have been press-fitted into the press-fit holding portion 140, the end 116 of the winding portion 115 is pulled to insert the lock protrusion 159 into the lock hole 117 so as to lock the end 116 of the winding portion 115 to the lock protrusion 159.

Thereafter, the actuation signal line LW is connected to the connector 124 at the base portion 120b side of the inflator 120, and the attachment bracket portions 153 (L, R) of the attachment base 130 are attached to the bracket 102 at the body 101 side using the bolts 103 and the nuts 104. Accordingly, the airbag device 109 can be mounted at the predetermined mounting part below the glove box 107.

After the airbag device 109 has been mounted, when the inflator 120 is activated, the inflation gas G is discharged from the gas discharge port 122a of the gas discharge portion 122. The body portion 111 of the airbag 110 is deployed and inflated by the inflation gas G that has flowed therein through the inflow port portion 112, so that the door portions 172F, 172B of the airbag cover 170 are pushed and opened, and the airbag 110 is arranged in front of the knee of the passenger at the passenger seat.

Then, in the airbag device 109 according to the second embodiment, the inflow port portion 112 that extends from the body portion 111 of the folded airbag 110 is provided in the press-fit holding portion 140 of the holding plate portion 131 of the attachment base 130, and the front end 120a side of the inflator 120 is press-fitted into the inflow port portion 112. Accordingly, the press-fitting holding portion 140 has the inner diameter dimension dh at which the inflow port portion 112 into which the distal end 120a side of the inflator 120 is inserted after the press-fitting can be held. Therefore, the inflow port portion 112 of the airbag 110 and the distal end 120a side of the inflator 120 that is inserted into inflow port portion 112 are assembled to the holding plate portion 131 of the attachment base 130 using the press-fit holding portion 140 so as to be held by the holding plate portion 131. In this assembly structure, it is possible to easily assemble the inflow port portion 120 simply by press-fitting the inflator 120 and the inflow port portion 112 of the airbag 110 into the press-fit holding portion 140 provided at the holding plate portion 131 without using bolts and nuts.

Therefore, in the airbag device 109 according to the second embodiment, it is possible to reduce the number of components, to reduce weight, and to easily assemble the airbag 110 and the inflator 120 to the attachment base 130 simply by press-fitting the inflator 120 and the inflow port portion 112 of the airbag 110 into the press-fit holding portion 140.

In the second embodiment, a case is exemplified in which the inflow port portion 112 is provided at an inner peripheral side of the press-fit holding portion 140 and the front end 120a side of the inflator 120 is press-fitted into the inflow port portion 112. However, if there is a space around the press-fit holding portion 140, the inflow port portion 112 in the state in which the distal end 120a side of the inflator 120 is inserted therein may be press-fitted into the press-fit holding portion 140. In this case, in the second embodiment, the inflow port portion 112 in the state in which the distal end 120a side of the inflator 120 is inserted therein may be inserted into the press-fit holding portion 140 from the base portion 120b side of the inflator 120 so as to be press-fitted into the press-fit holding portion 140.

In the airbag device 109 according to the second embodiment, the press-fit holding portion 140 includes, at the inner peripheral surface 141 side thereof, the plurality of beads 143 that protrude from the surrounding general portion 142 and are configured to be pressed against the outer peripheral surface 112a side of the inflow port portion 112 in a state in which the distal end 120a side of the inflator 120 is inserted therein.

Therefore, in the second embodiment, the outer peripheral surface 112a of the inflow port portion 112 be press-fitted may not be slid relative to an entire surface of the inner peripheral surface 141 of the press-fit holding portion 140, or the outer peripheral surface 121 of the inflator 120 may not be slid relative to the entire surface of the inner peripheral surface 141 with the inflow port portion 112 interposed therebetween. The outer peripheral surface 112a of the inflow port portion 112 to be press-fitted may be slid relative to the part (the top part) 143a of a distal end of the bead 143 that has a narrow area, or the outer peripheral surface 121 of the inflator 120 may be slid relative to the part (the top part) 143a with the inflow port portion 112 interposed therebetween. Therefore, it is possible to smoothly press-fit the inflator 120 and the inflow port portion 112 of the airbag 110 into the press-fit holding portion 140, and to prevent the holding force from decreasing after press-fitting.

In the airbag device 109 according to the second embodiment, the holding plate portion 131 is formed of sheet metal, and includes, at the back surface (the upper surface) 131b side and adjacent to the press-fit holding portion 140, the concave part 133 capable of housing substantially halves of the inflow port portion 112 in the state in which the distal end 120a side of the inflator 120 is inserted therein and the inflator 120 in the direction orthogonal to the axis. The press-fit holding portion 140 includes the halved annular bodies 144, 146 that are divided into the concave part 133 side and the side covering the concave part 133 around the axial center IC of the inflator 120, and the two halved annular bodies 144, 146 are provided at the positions displaced along the axial center (the axial direction) IC of the inflator 120.

Therefore, in the second embodiment, the press-fit holding portion 140 is displaced along the axial center (the axial direction) IC of the inflator 120. However, the press-fit holding portion 140 includes the halved annular bodies 144, 146 that each have substantially half a circumference, and can wrap and hold an entire periphery of the inflow port portion 112 of the airbag 110 into which the distal end 120a side of the inflator 120 is inserted. Of course, the two halved annular bodies 144, 146 that each have substantially half a circumference is displaced along the axial direction (the axial center) IC of the inflator 120. Therefore, when the concave part 133 configured to house the inflator is formed by pressing the holding plate portion 131 formed of sheet metal, the halved annular body 144 at the concave part 133 side that is recessed toward the front surface 131a side of the holding plate portion 131 and the convex halved annular body 146 on the side covering the concave part 133 that protrudes toward the back surface 131b side of the holding plate portion 131 may be shifted along the axial center IC of the inflator 120, and may be plastically deformed so as to form concave parts and convex parts. Accordingly, the halved annular bodies 144, 146 can be easily formed.

In the airbag device 109 according to the second embodiment, the airbag 110 includes the winding portion 115 that is configured to be wound around the inflow port portion 112 into which the distal end 120a side of the inflator 120 is inserted so as to press against an inflator 120 side and that is provided at the inflow port portion 112, and the lock protrusion 159 that is the lock portion configured to lock the lock hole 117 that is the to-be-locked portion provided at the end 116 of the winding portion 115 after the winding. The lock protrusion 159 is provided at the attachment base 130.

Therefore, in the second embodiment, if the end 116 formed with the lock hole 117 that is the to-be-locked portion is locked to the lock protrusion 159 that is the surrounding lock portion to prevent the winding portion 115 from loosening and to maintain the winding state, the inflow port portion 112 of the airbag 110 is pressed against the outer peripheral surface 121 of the inflator 120 by the winding portion 115. Therefore, an inner peripheral surface 112b side of the inflow port portion 112 closely adheres to the outer peripheral surface 121 of the inflator 120 to attain good gas sealing performance, so that it is possible to prevent leakage of the inflation gas G accurately even if the press-fit holding portion 140 cannot properly seal entire circumference of the outer peripheral surface 121 of the inflator 120 in a circumferential direction of the outer peripheral surface 121. The winding portion 115 is locked to the attachment base 130, so that it is possible to prevent movement of the inflator 120, around which the winding portion 115 is wound, or the like along the axial center IC of the inflator 120, and to stabilize an assembly position of the inflow port portion 112 and the inflator 120 with respect to the attachment base 130.

The press-fit holding portion 140 can press the inflow port portion 112 against the entire circumference of the outer peripheral surface 121 of the inflator 120 in the circumferential direction of the outer peripheral surface 121 without providing a bead to attain good gas sealing performance, so that the winding portion 115 may not be provided.

In the second embodiment, the halved annular body 144 is formed with the slit 145 through which the connection seat portion 118 of the airbag 110 is inserted, and the body portion 111 of the airbag 110 is supported by the inflator 120 over substantially an entire length of the inflow port portion 112 in the axial direction as well as a communication part with the inflow port portion 112. Accordingly, it is possible to prevent left and right swinging of the body portion 111 when the body portion 111 is deployed and inflated, and the body portion 111 of the airbag 110 is quickly and stably positioned in front of the passenger at the passenger seat.

If the slit 145 of the halved annular body 144 is slightly widened at beginning of the press-fitting of the inflator 120, it is possible to smoothly perform the press-fitting operation of the inflator 120.

Figure 23:
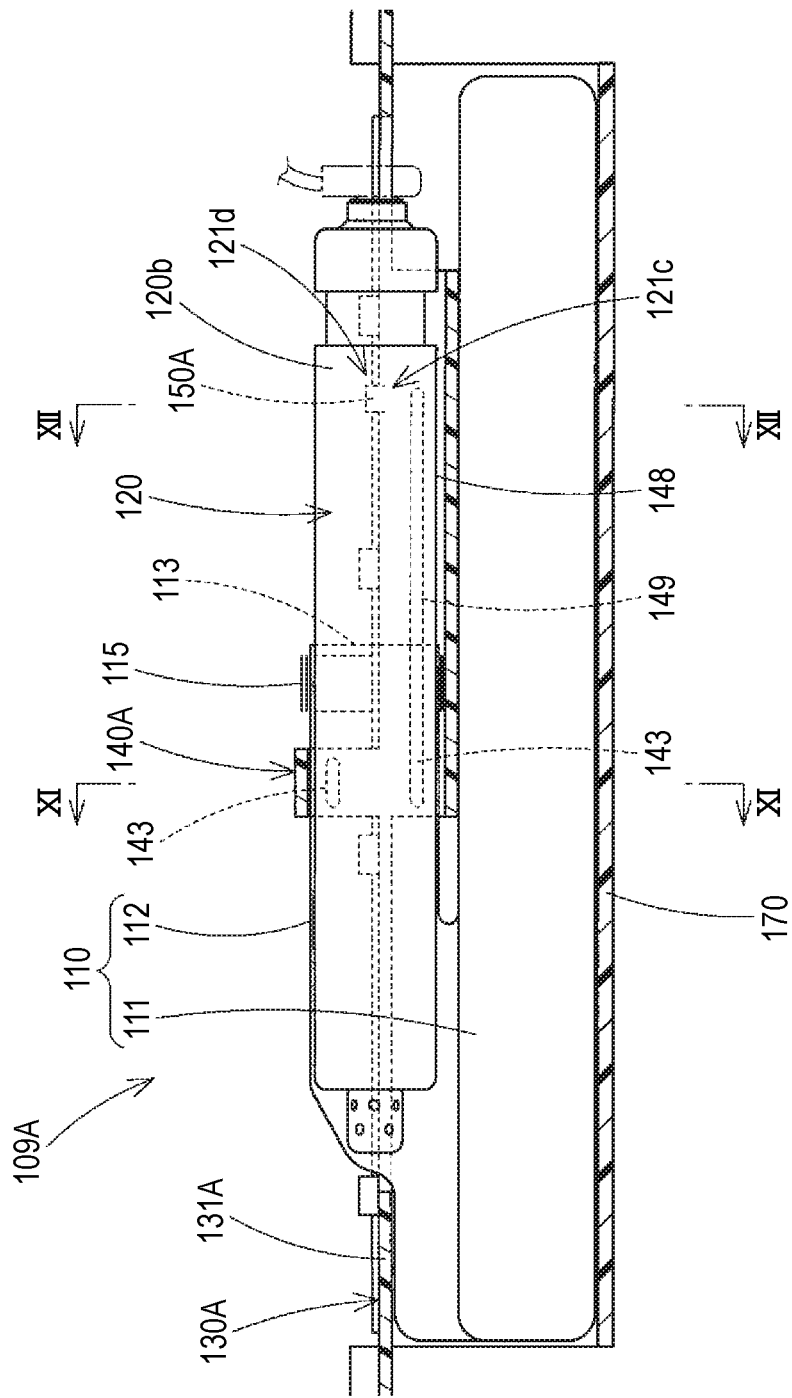
FIG. 23 is a schematic longitudinal sectional view of an airbag device according to a modification of the second embodiment along the left-right direction.
Figure 24:
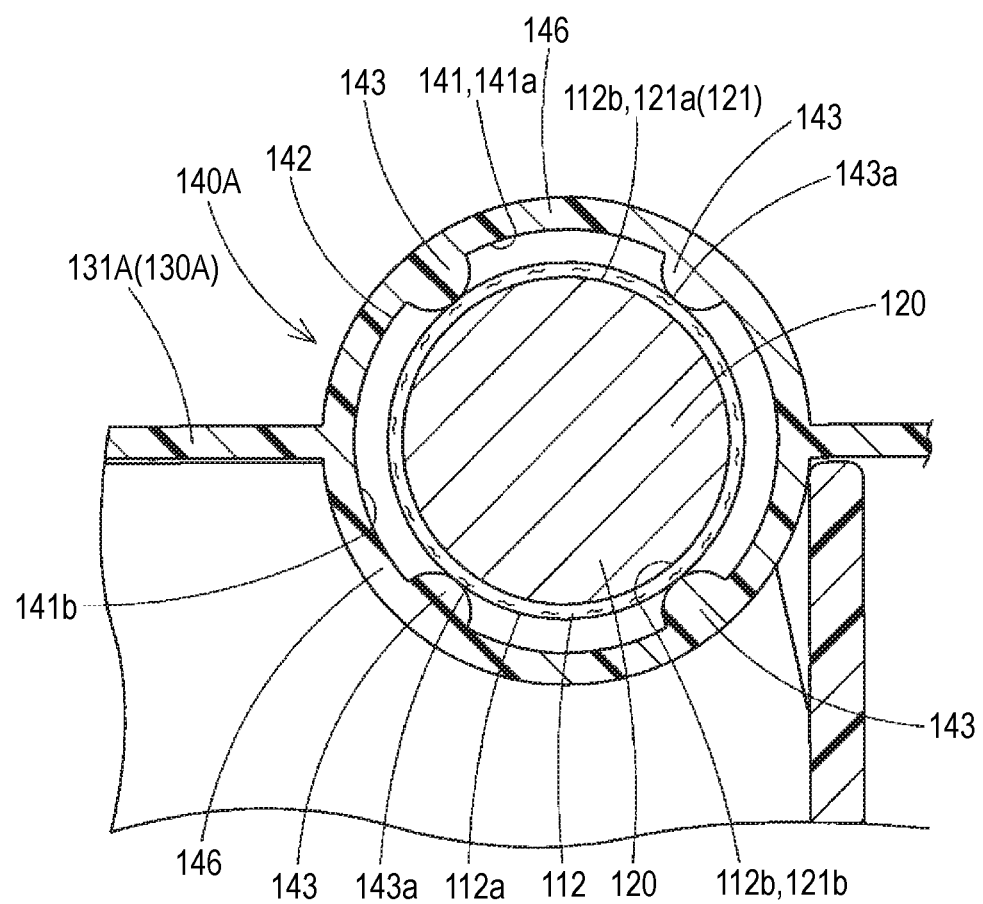
FIG. 24 is a schematic longitudinal sectional view of the airbag device illustrated in FIG. 23, and corresponds to an XI-XI part in FIG. 23.
Figure 25:
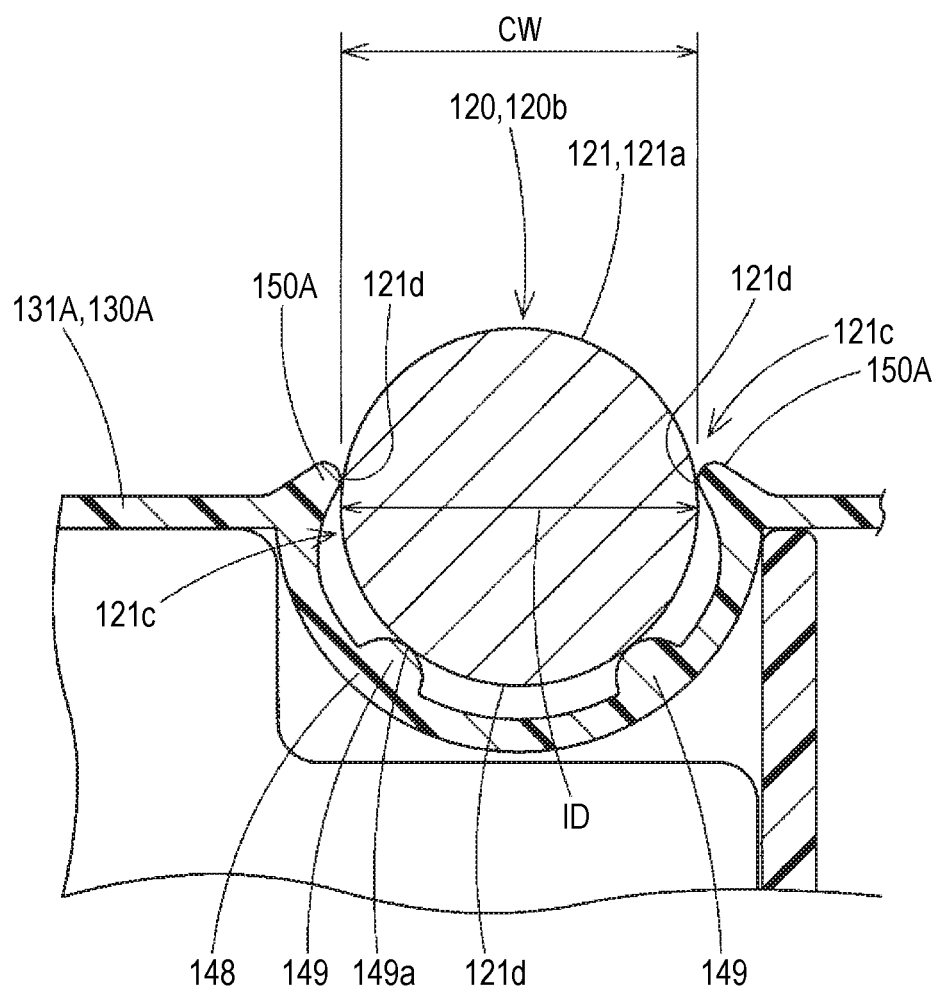
FIG. 25 is a schematic longitudinal sectional view of the airbag device illustrated in FIG. 23, and corresponds to an part in FIG. 23.

In the second embodiment, the attachment base 130 formed of sheet metal is exemplified. However, an attachment base 130A may be formed by molding from a synthetic resin that is polypropylene or the like as in the airbag device 109A illustrated in FIGS. 23 to 25. In the attachment base 130A that is formed of synthetic resin and is formed by molding, the press-fit holding portion 140A formed at the holding plate portion 131A may be formed into a substantially cylindrical shape displaced along the axial center IC of the inflator 120 but into a cylindrical shape surrounding a periphery of the axial center IC by molding. Therefore, the press-fit holding portion 140A may be formed into a cylindrical shape continuous in the circumferential direction. The plurality of (four in the illustrated example) beads 143 are formed at the inner peripheral surface 141 of the press-fit holding portion 140A along the axial center IC of the inflator 120 so as to prevent sliding resistance at a time of press-fitting the inflator 120 or the like into the press-fit holding portion 140A.

In the attachment base 130A that is formed of synthetic resin and can be formed by molding, lock claws 150A, 150A provided at a support portion 148 side of the concave part 133 of the assembly seat 132 can be formed so as to increase sandwiching force and to sandwich an upper part 121d beyond a wide diameter region of the side surface portion 121c of the inflator 120. That is, a separation distance CW between the lock claws 150A, 150A on both sides can be smaller than a diameter dimension ID of the inflator 120, and can be set to a dimension that allows the base portion 120b of the inflator 120 to be fitted from above.

Figure 26:
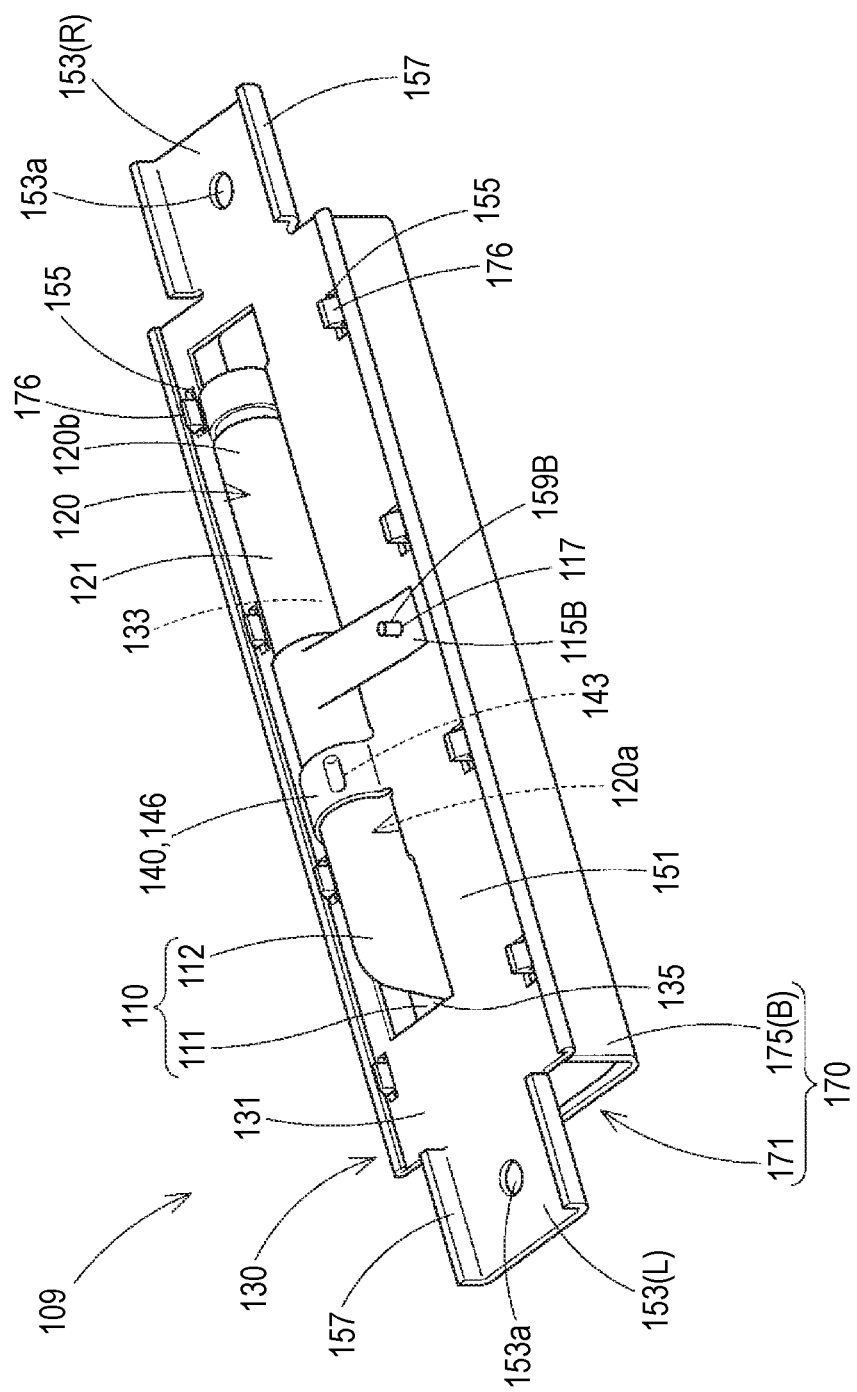
FIG. 26 illustrates a modification of a winding portion and a lock portion of the airbag according to the second embodiment.
Figure 27:
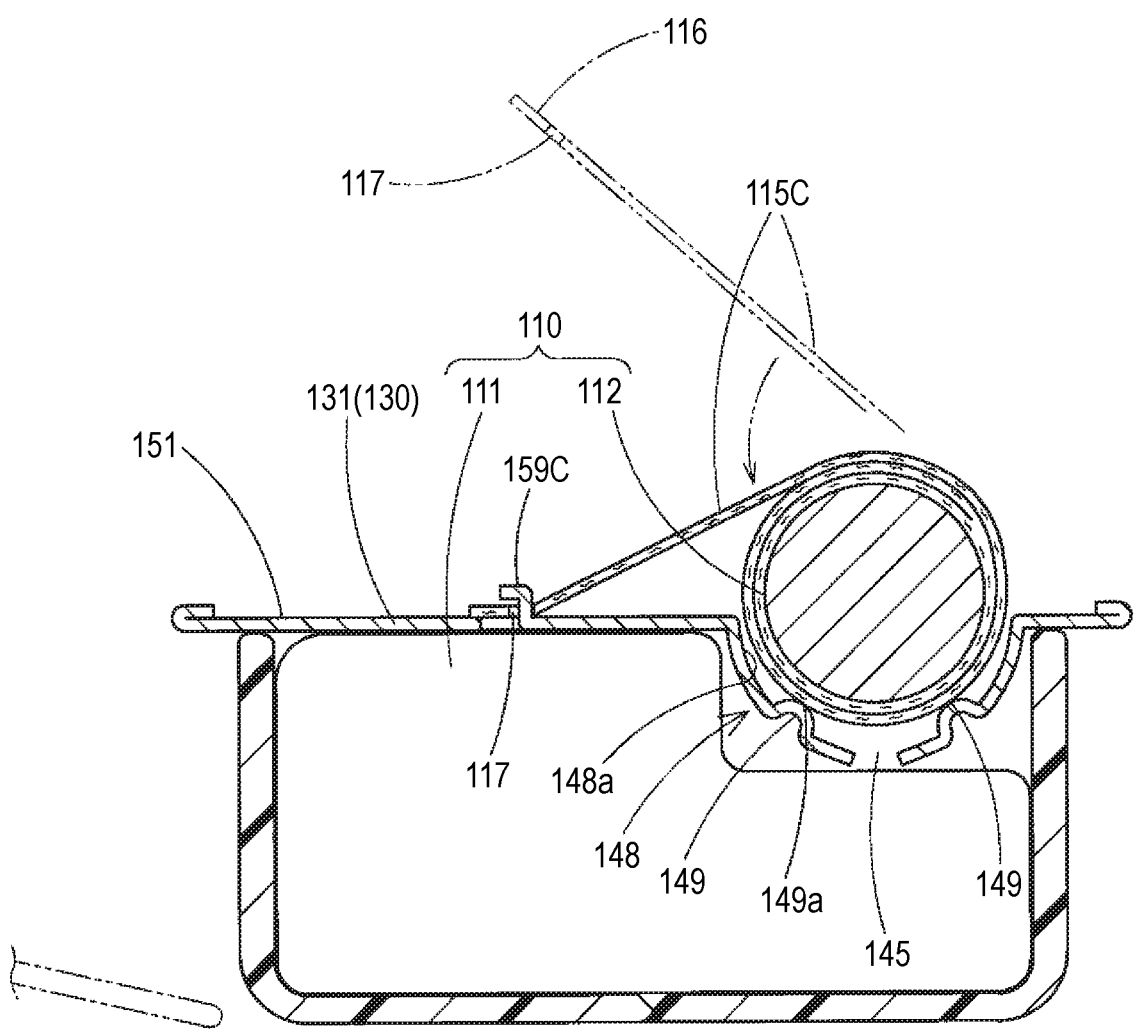
FIG. 27 illustrates another modification of the winding portion and the lock portion of the airbag according to the second embodiment.

In the second embodiment, the winding portion 115 provided at the inflow port portion 112 of the airbag 110 is locked to the lock protrusion 159 provided at a front edge side of the support seat 151. However, as illustrated in FIG. 26, a lock protrusion 159B that is a lock portion provided at the support seat 151 at a front side of the inflator 120 may be inserted into the lock hole 117 of the end 116 to lock a winding portion 115B to the lock protrusion 159B. The lock protrusion 159B may be formed by a pin, a bolt, or the like provided at the support seat 151. Alternatively, as illustrated in FIG. 27, a lock protrusion 159C may be formed by performing cutting and raising from the support seat 151, and the lock protrusion 159C that is a lock portion may be inserted into the lock hole 117 that is the to-be-locked portion of the end 116 of a winding portion 115C to lock the winding portion 1150 to the lock protrusion 159C.

In the second embodiment, the knee protection airbag device 109 configured to protect the knee of the passenger at the passenger seat has been described. However, in the airbag device, as long as the inflator is inserted into the inflow port portion of the airbag and the airbag and the inflator are assembled to the attachment base, the airbag device is not limited to the knee protection airbag device. The present invention may be applied to a passenger airbag device or the like configured to protect an upper body of the passenger at the passenger seat.

According to an aspect of the invention, there is provided an airbag device including an airbag configured to inflate by allowing inflation gas to flow therein, an inflator configured to supply the inflation gas to the airbag, and an attachment base configured to hold the airbag and the inflator and configured be mounted on a mounting part, wherein the inflator has a substantially columnar shape, and includes, at a distal end side thereof, a gas discharge portion which is configured to discharge the inflation gas, the airbag includes a body portion which is configured to inflate from a folded state by allowing the inflation gas to flow therein, and a cylindrical inflow port portion which is communicated with the body portion, into which the distal end side of the inflator is inserted, and which is configured to allow the inflation gas from the inflator to flow into the body portion, the attachment base is formed of sheet metal, and includes a holding plate portion which is configured to allow the folded body portion to be provided at a front surface side thereof to hold the folded body portion, and which is configured to allow the inflow port portion and the inflator inserted into the inflow port portion to be provided at a back surface side thereof to hold the inflow port portion and the inflator, the holding plate portion includes a pressing portion and a support portion that are provided at positions displaced around an axial center of the inflator so as to surround a periphery of the inflow port portion into which the distal end side of the inflator is inserted, the pressing portion is plastically deformable so as to approach a side of the support portion by being crimped, and the distal end side of the inflator inserted between the pressing portion and the support portion and the inflow port portion of the airbag into which the distal end side of the inflator is inserted are sandwiched between the crimped pressing portion and the support portion, and are held by the attachment base.

In the above airbag device, the inflow port portion that extends from the body portion of the folded airbag is provided between the pressing portions at the rear surface side of the holding plate portion of the attachment base and the support portions. The distal end side of the inflator is inserted into the inflow port portion, and then the pressing portions are plastically deformed by being crimped. Accordingly, the inflow port portion of the airbag into which the distal end side of the inflator is inserted is sandwiched between the crimped pressing portions and the support portions, and is assembled to and held by the attachment base. In this assembly structure, it is possible to easily assemble the inflow port portion simply by crimping and plastically deforming the pressing portions provided around the inflow port portion without using bolts and nuts.

Therefore, in the above airbag device, it is possible to reduce the number of components, to reduce weight, and to easily assemble the airbag and the inflator to the attachment base simply by crimping the pressing portions.

The holding plate portion may include the pressing portion that is provided at the distal end side of the inflator, the support portion that is provided so as to be displaced from the pressing portion in a direction along the axial center of the inflator, and a second pressing portion that is configured to be crimped so as to press against a side of the axial center of the inflator to press the inflator against the side of the support portion and that is provided at a position away from the pressing portion with the support portion therebetween in the direction along the axial center of the inflator.

In this configuration, along the axial direction of the inflator, the inflator and the inflow port portion of the airbag are supported at a plurality of positions of the two pressing portions and the one support portion, so that the inflator and the inflow port portion of the airbag are stably held by the holding plate portion of the attachment base.

The airbag may include a winding portion that is configured to be wound around the inflow port portion into which the distal end side of the inflator is inserted so as to press against a side of the inflator and that is provided at the inflow port portion, and the attachment base or the inflator may include a lock portion that is configured to lock a to-be-locked portion provided at an end of the winding portion so as to maintain a winding state of the winding portion.

In this configuration, if the end formed with the to-be-locked portion is locked to the surrounding lock portion to prevent the winding portion from loosening and to maintain the winding state, the inflow port portion of the airbag is pressed against the outer peripheral surface of the inflator by the winding portion. Therefore, an inner peripheral surface side of the inflow port portion closely adheres to the outer peripheral surface of the inflator to attain good gas sealing performance, so that it is possible to prevent leakage of the inflation gas accurately even if the pressing portion and the support portion cannot properly seal entire circumference of the outer peripheral surface of the inflator in a circumferential direction of the outer peripheral surface.

The airbag may include, at an inner peripheral side of the inflow port portion, a flexible sheet member for a check valve that closely adheres to an outer peripheral surface of the inflator by pressure of the inflation gas to flow out so as to prevent the inflation gas discharged from the gas discharge portion of the inflator from flowing out of the inflow port portion.

In this configuration, a check valve formed of the sheet member is provided at the inner peripheral side of the inflow port portion of the airbag. Even if the pressing portion and the support portion cannot seal the entire circumference of the outer peripheral surface of the inflator in the circumferential direction, the sheet member that is the check valve closely adheres to the outer peripheral surface of the inflator by pressure of the inflation gas to flow out so as to attain good gas sealing performance, so that it is possible to prevent the leakage of the inflation gas accurately.

The support portion of the holding plate portion may include a bead that protrudes from a surrounding general portion and that is configured to be pressed against the inflow port portion into which the distal end side of the inflator is inserted.

In this configuration, a sandwiching part to be pressed is a narrow area and is at a fixed position without displacement, so that it is possible to stabilize the support performed by the support portion of the inflator and the inflow port portion for each airbag device. The bead is provided along a circumferential direction of the outer peripheral surface of the inflator. Accordingly, it is possible to press the inflow port portion against the outer peripheral surface along the circumferential direction of the inflator using the bead, and to improve the gas sealing performance of the inflow port portion by cooperating with a part of the pressing portion to be crimped.

According to an aspect of the invention, there is also provided an airbag device including an airbag configured to inflate by allowing inflation gas to flow therein, an inflator configured to supply the inflation gas to the airbag, and an attachment base configured to hold the airbag and the inflator and configured to be mounted on a mounting part, wherein the inflator has a substantially columnar shape, and includes, at a distal end side thereof, a gas discharge portion which is configured to discharge the inflation gas, the airbag includes a body portion which is configured to inflate from a folded state by allowing the inflation gas to flow therein, and a cylindrical inflow port portion which is communicated with the body portion, into which the distal end side of the inflator is inserted, and which is configured to allow the inflation gas from the inflator to flow into the body portion, the attachment base includes a holding plate portion which is configured to allow the folded body portion to be provided at a front surface side thereof to hold the folded body portion, and which is configured to allow the inflow port portion and the inflator inserted into the inflow port portion to be provided at a back surface side thereof to hold the inflow port portion and the inflator, and the holding plate portion includes a press-fit holding portion having an inner diameter dimension at which the distal end side of the inflator is capable of being press-fitted into the inflow port portion provided at an inner peripheral side of the press-fit holding portion or the inflow port portion is capable of being press-fitted in a stale in which the distal end side of the inflator is inserted therein, and at which the inflow port portion into which the distal end side of the inflator is inserted is capable of being held after press-fitting.

In the above airbag device, the inflow port portion that extends from the body portion of the folded airbag is provided in the press-fit holding portion of the holding plate portion of the attachment base, and the front end side of the inflator is press-fitted into the inflow port portion, or the inflow port portion in the state in which the distal end side of the inflator is inserted therein is press-fitted. Accordingly, the press-fitting holding portion has the inner diameter dimension at which the inflow port portion into which the distal end side of the inflator is inserted after the press-fitting can be held. Therefore, the inflow port portion of the airbag and the distal end side of the inflator that is inserted into the inflow port portion are assembled to the holding plate portion of the attachment base using the press-fit holding portion so as to be held by the holding plate portion. In this assembly structure, it is possible to easily assemble the inflow port portion simply by press-fitting the inflator and the inflow port portion of the airbag into the press-fit holding portion provided at the holding plate portion without using bolts and nuts.

Therefore, in the above airbag device, it is possible to reduce the number of components, to reduce weight, and to easily assemble the airbag and the inflator to the attachment base simply by press-fitting the inflator and the inflow port portion of the airbag into the press-fit holding portion.

The press-fit holding portion may include, at an inner peripheral side thereof, a plurality of beads that protrude from a surrounding general portion and that are configured to be pressed against an outer peripheral surface side of the inflow port portion in the state in which the distal end side of the inflator is inserted therein.

In this configuration, the outer peripheral surface of the inflow port portion to be press-fitted may not be slid relative to an entire surface of the inner peripheral surface of the press-fit holding portion, or the outer peripheral surface of the inflator may not be slid relative to the entire surface of the inner peripheral surface with the inflow port portion interposed therebetween. The outer peripheral surface of the inflow port portion to be press-fitted may be slid relative to the part of a distal end of the bead that has a narrow area, or the outer peripheral surface of the inflator may be slid relative to the part with the inflow port portion interposed therebetween. Therefore, it is possible to smoothly press-fit the inflator and the inflow port portion of the airbag into the press-fit holding portion, and to prevent the holding force from decreasing after press-fitting.

The holding plate portion may be formed of sheet metal, and include, at the back surface side thereof and adjacent to the press-fit holding portion, a concave part configured to house substantially halves of the inflow port portion in the state in which the distal end side of the inflator is inserted therein and the inflator in a direction orthogonal to an axis, and the press-fit holding portion may include halved annular bodies that are divided into a concave part side and a side covering the concave part around the axial center of the inflator, and the two halved annular bodies may be provided at positions displaced along the axial center of the inflator.

In this configuration, the press-fit holding portion is displaced along the axial center of the inflator. However, the press-fit holding portion includes the halved annular bodies that each have substantially half a circumference, and can wrap and hold an entire periphery of the inflow port portion of the airbag into which the distal end side of the inflator is inserted. Of course, the two halved annular bodies that each have substantially half a circumference is displaced along the axial center of the inflator. Therefore, when the concave part configured to house the inflator is formed by pressing the holding plate portion formed of sheet metal, the halved annular body at the concave part side that is recessed toward the front surface side of the holding plate portion and the convex halved annular body on the side covering the concave part that protrudes toward the back surface side of the holding plate portion may be shifted along the axial center of the inflator, and may be plastically deformed so as to form concave parts and convex parts. Accordingly, the halved annular bodies can be easily formed.

The airbag may include a winding portion that is configured to be wound around the inflow port portion into which the distal end side of the inflator is inserted so as to press against a side of the inflator and that is provided at the inflow port portion, and the attachment base may include a lock portion that is configured to lock a to-be-locked portion provided at an end of the winding portion after winding.

In this configuration, if the end formed with the to-be-locked portion is locked to the surrounding lock portion to prevent the winding portion from loosening and to maintain the winding state, the inflow port portion of the airbag is pressed against the outer peripheral surface of the inflator by the winding portion. Therefore, an inner peripheral surface side of the inflow port portion closely adheres to the outer peripheral surface of the inflator to attain good gas sealing performance, so that it is possible to prevent leakage of the inflation gas accurately even if the press-fit holding portion cannot properly seal entire circumference of the outer peripheral surface of the inflator in a circumferential direction of the outer peripheral surface. The winding portion is locked to the attachment base, so that it is possible to prevent movement of the inflator, around which the winding portion is wound, or the like along the axial center of the inflator, and to stabilize an assembly position of the inflow port portion and the inflator with respect to the attachment base.

The invention claimed is:

1. An airbag device including an airbag configured to inflate by allowing inflation gas to flow therein, an inflator configured to supply the inflation gas to the airbag, and an attachment base configured to hold the airbag and the inflator and configured be mounted on a mounting part, wherein the inflator has a substantially columnar shape, and includes, at a distal end side thereof, a gas discharge portion which is configured to discharge the inflation gas, the airbag includes a body portion which is configured to inflate from a folded state by allowing the inflation gas to flow therein, and a cylindrical inflow port portion which is communicated with the body portion, into which the distal end side of the inflator is inserted, and which is configured to allow the inflation gas from the inflator to flow into the body portion, the attachment base is formed of sheet metal, and includes a holding plate portion which is configured to allow the folded body portion to be provided at a front surface side thereof to hold the folded body portion, and which is configured to allow the inflow port portion and the inflator inserted into the inflow port portion to be provided at a back surface side thereof to hold the inflow port portion and the inflator, the holding plate portion includes a pressing portion and a support portion that are provided at positions displaced around an axial center of the inflator so as to surround a periphery of the inflow port portion into which the distal end side of the inflator is inserted, the pressing portion is plastically deformable so as to approach a side of the support portion by being crimped, and the distal end side of the inflator inserted between the pressing portion and the support portion and the inflow port portion of the airbag into which the distal end side of the inflator is inserted are sandwiched between the crimped pressing portion and the support portion, and are held by the attachment base.

2. The airbag device according to claim 1, wherein the holding plate portion includes the pressing portion that is provided at the distal end side of the inflator, the support portion that is provided so as to be displaced from the pressing portion in a direction along the axial center of the inflator, and a second pressing portion that is configured to be crimped so as to press against a side of the axial center of the inflator to press the inflator against the side of the support portion and that is provided at a position away from the pressing portion with the support portion therebetween in the direction along the axial center of the inflator.

3. The airbag device according to claim 1, wherein the airbag includes a winding portion that is configured to be wound around the inflow port portion into which the distal end side of the inflator is inserted so as to press against a side of the inflator and that is provided at the inflow port portion, and
the attachment base or the inflator includes a lock portion that is configured to lock a to-be-locked portion provided at an end of the winding portion so as to maintain a winding state of the winding portion.

4. The airbag device according to claim 1, wherein the airbag includes, at an inner peripheral side of the inflow port portion, a flexible sheet member for a check valve that closely adheres to an outer peripheral surface of the inflator by pressure of the inflation gas to flow out so as to prevent the inflation gas discharged from the gas discharge portion of the inflator from flowing out of the inflow port portion.

5. The airbag device according to claim 1, wherein the support portion of the holding plate portion includes a bead that protrudes from a surrounding general portion and that is configured to be pressed against the inflow port portion into which the distal end side of the inflator is inserted.

6. An airbag device including an airbag configured to inflate by allowing inflation gas to flow therein, an inflator configured to supply the inflation gas to the airbag, and an attachment base configured to hold the airbag and the inflator and configured to be mounted on a mounting part, wherein
the inflator has a substantially columnar shape, and includes, at a distal end side thereof, a gas discharge portion which is configured to discharge the inflation gas,
the airbag includes a body portion which is configured to inflate from a folded state by allowing the inflation gas to flow therein, and a cylindrical inflow port portion which is communicated with the body portion, into which the distal end side of the inflator is inserted, and which is configured to allow the inflation gas from the inflator to flow into the body portion,
the attachment base includes a holding plate portion which is configured to allow the folded body portion to be provided at a front surface side thereof to hold the folded body portion, and which is configured to allow the inflow port portion and the inflator inserted into the inflow port portion to be provided at a back surface side thereof to hold the inflow port portion and the inflator, and
the holding plate portion includes a press-fit holding portion having an inner diameter dimension at which the distal end side of the inflator is capable of being press-fitted into the inflow port portion provided at an inner peripheral side of the press-fit holding portion or the inflow port portion is capable of being press-fitted in a state in which the distal end side of the inflator is inserted therein, and at which the inflow port portion into which the distal end side of the inflator is inserted is capable of being held after press-fitting.

7. The airbag device according to claim 6, wherein the press-fit holding portion includes, at an inner peripheral side thereof, a plurality of beads that protrude from a surrounding general portion and that are configured to be pressed against an outer peripheral surface side of the inflow port portion in the state in which the distal end side of the inflator is inserted therein.

8. The airbag device according to claim 6, wherein the holding plate portion is formed of sheet metal, and includes, at the back surface side thereof and adjacent to the press-fit holding portion, a concave part configured to house substantially halves of the inflow port portion in the state in which the distal end side of the inflator is inserted therein and the inflator in a direction orthogonal to an axis, and
the press-fit holding portion includes halved annular bodies that are divided into a concave part side and a side covering the concave part around an axial center of the inflator, and the two halved annular bodies are provided at positions displaced along the axial center of the inflator.

9. The airbag device according to claim 6, wherein the airbag includes a winding portion that is configured to be wound around the inflow port portion into which the distal end side of the inflator is inserted so as to press against a side of the inflator and that is provided at the inflow port portion, and
the attachment base includes a lock portion that is configured to lock a to-be-locked portion provided at an end of the winding portion after winding.

* * * * *